United States Patent [19]

Uchida et al.

[11] Patent Number: 5,313,453
[45] Date of Patent: May 17, 1994

[54] APPARATUS FOR TESTING ATM CHANNELS

[75] Inventors: Yoshihiro Uchida; Satoshi Kakuma; Naoyuki Izawa; Yasuhiro Aso; Shuji Yoshimura; Masami Murayama, all of Kawasaki, Japan

[73] Assignee: Fujitsu Limited, Kawasaki, Japan

[21] Appl. No.: 854,888

[22] Filed: Mar. 20, 1992

Related U.S. Application Data

[63] Continuation-in-part of Ser. No. 750,451, Aug. 27, 1991, abandoned.

[30] Foreign Application Priority Data

Mar. 20, 1991 [JP] Japan .................. 3-057132

[51] Int. Cl.[5] ................ H04L 12/56; H04Q 11/04; H04J 3/14
[52] U.S. Cl. ......................... 370/13; 370/15; 370/60; 370/94.1
[58] Field of Search .............. 370/13, 14, 15, 53, 370/54, 58.1, 58.2, 58.3, 60, 94.1

[56] References Cited

U.S. PATENT DOCUMENTS

| 4,486,877 | 12/1984 | Turner | 370/15 |
|---|---|---|---|
| 4,745,593 | 5/1988 | Stewart | 370/15 |
| 5,062,106 | 10/1991 | Yamazaki et al. | 370/94.1 |
| 5,072,440 | 12/1991 | Isono et al. | 370/60 |
| 5,084,867 | 1/1992 | Tachibana et al. | 370/54 |
| 5,119,369 | 6/1992 | Tanabe et al. | 370/60 |

FOREIGN PATENT DOCUMENTS 0351014 1/1990 European Pat. Off.

OTHER PUBLICATIONS

Muise, R. W. et al., "Experiments in Wideband Packet Technology", 1986 International Zurich Seminar On Digital Communications, Zurich, Switzerland, Mar. 11-13, 1986, pp. 135-139, Proceedings IEEE Catalog No. 86CH2277-2.

"Method and Arrangement for Testing Switch-Network Components," IBM Technical Disclosure Bulletin, vol. 31, No. 8, Jan. 1989, pp. 414-427.

Primary Examiner—Douglas W. Olms
Assistant Examiner—Alpus H. Hsu
Attorney, Agent, or Firm—Staas & Halsey

[57] ABSTRACT

A first form of an ATM channel testing apparatus tests an ATM channel by having a test cell detector in each switch to detect whether or not the switch appropriately switches a test cell generated by a test cell generating trunk. A second form of an ATM channel testing apparatus easily tests an ATM channel by having test cell generators provided for the respective input highways sequentially generating test cells including test cell identifying information and input highway identifying information, and having test cell checkers provided respectively for the output highways simply tally the test cells by the respective input highways. A third form of an ATM channel testing apparatus tests an ATM channel with less pieces of hardware by having turn-around parts in respective ordinary trunks sequentially turn around a test cell generated by a test cell generating trunk to be finally returned to the test cell generating trunk. A fourth form of an ATM channel testing apparatus tests an ATM channel by having a test cell checker provided for each of output highways to examine whether or not the test data carried in respective octets of the payloads in extracted test cells are of consecutive values.

18 Claims, 31 Drawing Sheets

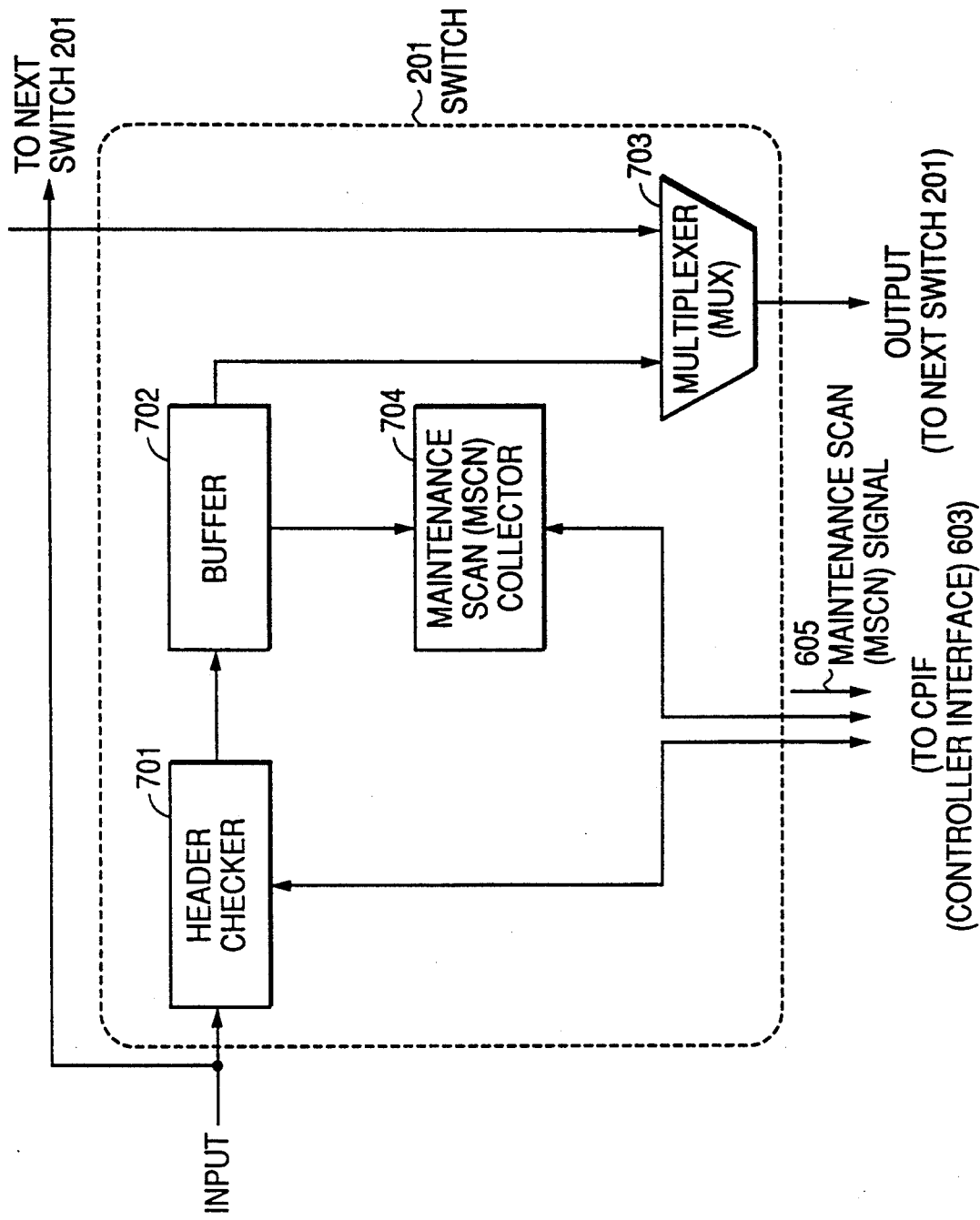

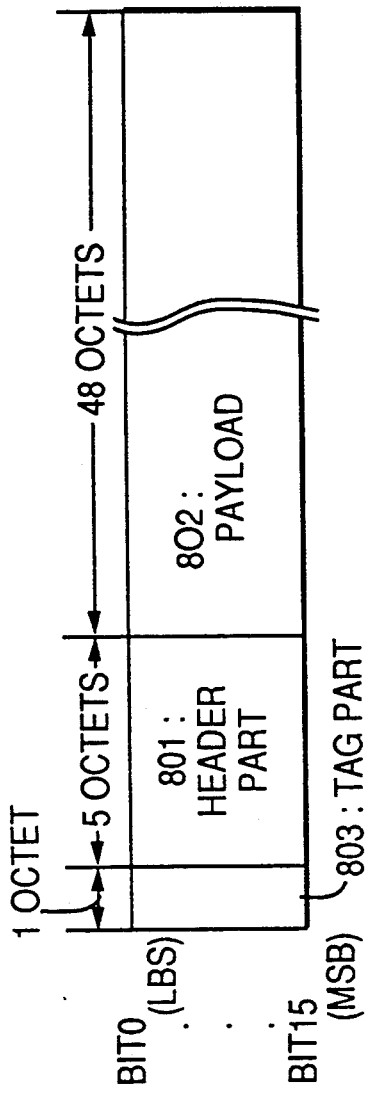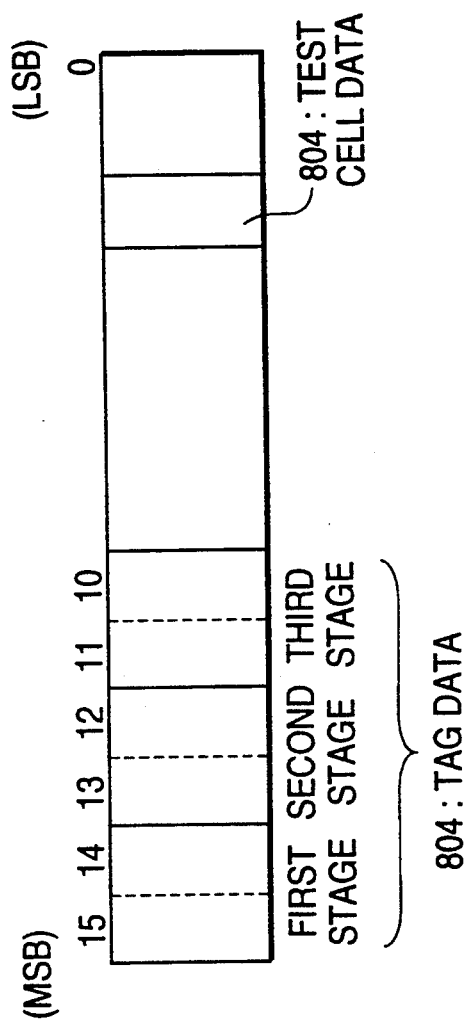

FIG. 15

| | FIRST TAG DATUM | SECOND TAG DATUM | THIRD TAG DATUM |
|---|---|---|---|
| TAG DATA OF TEST CELL NO. 1 → | 0 | 0 | 0 |
| TAG DATA OF TEST CELL NO. 2 → | 0 | 0 | 1 |
| TAG DATA OF TEST CELL NO. 3 → | 0 | 1 | 0 |
| TAG DATA OF TEST CELL NO. 4 → | 0 | 1 | 1 |
| TAG DATA OF TEST CELL NO. 5 → | 1 | 0 | 0 |
| TAG DATA OF TEST CELL NO. 6 → | 1 | 0 | 1 |
| TAG DATA OF TEST CELL NO. 7 → | 1 | 1 | 0 |
| TAG DATA OF TEST CELL NO. 8 → | 1 | 1 | 1 |

APPARATUS FOR TESTING ATM CHANNELS

CROSS REFERENCE TO RELATED APPLICATION

This application is a continuation-in-part application of U.S. patent application Ser. No. 07/750,451 filed on Aug. 27, 1991, now abandoned.

BACKGROUND OF THE INVENTION

1. Field of the Invention

This invention pertains to a digital switching system and more particularly to an apparatus for testing ATM (Asynchronous Transfer Mode) channels, according to a multistage self-routing method, to integrally switch information or payload traffics having different traffic characteristics, such as moving images, numerical data and voices, by using an ATM transmission system like a broadband integrated services digital network (B-ISDN).

2. Description of the Related Art

With the widespread use of data communications, public switched networks are now required to perform high-quality data communications, as well as the traditional voice communications.

A B-ISDN has begun to be utilized as a communications network not only for low-speed data, such as voice data, but also for high-speed data having a transfer rate between one hundred fifty megabits per second (150 Mbps) and six hundred megabits per second (600 Mbps), such as moving images, and various interfaces have begun to be standardized. The CCITT (International Telegraph and Telephone Consultative Committee) is currently working on its advisory report on the ATM transmission system, which is an essential technology for realizing a B-ISDN, to be submitted in 1992.

An ATM communications network transmits and exchanges information or payload data carried in different bands divided and housed in fixed-length data units called cells, to which headers are attached. A header contains a virtual channel identifier (VCI) for identifying the receiving side subscriber and a virtual path identifier (VPI) for identifying the path within the current ATM exchanger, in addition to other pertinent information e.g. on a payload type and a cell loss priority in case of discarding cells, as well as a CRC (cyclic redundancy checking) code for error correction. Thus, an ATM switching system uses the headers to enable hardware to transfer and switch cells to the receiving side subscriber at a high speed.

Since an ATM switching system requires cells to carry only necessary information, it can more efficiently transmit burst signals than a conventional STM (Synchronous Transfer Mode) switching system. Also, unlike a conventional packet switching system that has a processor switch cells equivalent to packets through software processing, since an ATM switching system has hardware provided in a channel switch cells, it does not require complex protocols in switching cells, which realizes high speed communications at transfer rates up to several hundred megabits per second.

This makes it possible to flexibly provide services requiring different transmission speeds, and to efficiently utilize transmission paths.

In this operation, according to the VCI attached to a cell, a switching system processor designates to which buffer in a switching module of the ATM switching system the cell is to be written. The cells flow autonomously in the network according to this designation. Hence, this switching arrangement is called a self-routing (SR). The receiving subscriber extracts necessary cells flowing over ATM highways based on the VCIs attached to cells, and restores user information or payload data by eliminating headers from the cells.

FIG. 1 is a schematic view of a generic ATM exchanger used in ATM switching system.

In FIG. 1, trunks 102 accommodate respective subscriber lines 101 on the input side. A virtual channel controller (VCC) 105 receives outputs from the trunks 102.

Based on the call control information inputted from a processor (not shown) of the switching system, the VCC 105 exchanges the VCIs, which specify the cells' destinations, attached to the headers of the received cells from the respective input highways 104, with new VCIs specifying the next output node (ATM switching system). At the same time, the VCC 105 attaches to the head ends of the cells information specifying the path over which the cells are to be switched to be outputted to destined output highways 108 in a data format called tags.

A plurality of multiplexers (MUXs) 103 partially multiplex respective outputs from the VCC 105. Respective input highways 104 receive outputs from the corresponding multiplexers 103.

A multistage self-routing channel (MSSR) 106, which is a virtual channel, receives respective outputs from the MUXs 105. The MSSR 106 comprises a plurality of self-routing modules (SRMs) 107. The MSSR 106 has a plurality (ordinarily two (2) rows and three (3) stages) of SRMs 107. The configuration of the SRMs 107 are further elaborated later.

The MSSR 106 outputs cells to output highways 108, which are connected to respective demultiplexers (DMUXs) 109, which demultiplex the cells and output the demultiplexed cells to subscriber lines 111 through output trunks 110 corresponding respectively to the DMUXs 109.

FIG. 1 shows a configuration where cells flow in a single direction over the channels. It goes without saying that channels for cells flowing in the opposite directions can be configured similarly.

FIG. 2 shows an exemplary configuration of one of the SRMs 107 shown in FIG. 1.

In the example shown in FIG. 2, each of the SRMs 107 has two (2) input lines and two (2) output lines, and switches 201 are provided at the four (4) crossing points of the input lines and output lines. That is, the four (4) switches of an SRM 107 correspond with two (2) input lines and two (2) output lines. Although an actual channel may comprise more input lines and more output lines in reality since their basic connections are entirely similar to those in the example shown in FIG. 2, the SRMs 107 are explained by referring to the 2×2 exemplary configuration having two (2) input lines and two (2) output lines.

The switches 201 judge from the tag data attached to the head ends of cells inputted from input lines whether or not to switch the cells for acceptance. If the switches 201 judge whether or not to switch the cells by themselves, the switches 201 multiplex the cells on free time slots on output lines. Respective switches 201 independently perform the judging and switching operations through hardware processing.

As is evident from the above explanation, a fault in one of the switches 201 in any of the SRMs 107 shown in FIG. 1 causes severe trouble, such as a degradation in communications quality and a stoppage of communications all together through discarding ATM cells and incorrectly switching ATM cells. Hence, it is crucial to conduct a test for verifying the normality of the switches.

However, there is no known conventional system for efficiently testing the switches of an ATM exchanger. Especially in the configuration, shown in FIG. 1, of the MSSR 106 having the SRMs 107 connected in a plurality of stages, the more there are possible paths from an input line to an output line, the more there are the SRMs 107 in the MSSR 106. This causes an inevitable problem of how to efficiently test all such possible paths in realizing an ATM exchanger.

SUMMARY OF THE INVENTION

This invention is conceived based on the above background, and aims at efficiently testing all paths in an ATM channel configured by respective switches.

A first form of this invention utilizes test cell generating trunks, test cell detectors, and a controller.

The test cell generating trunks are provided on the input side of an asynchronous transfer mode channel e.g. comprising a multistage self-routing channel having plural stages of self-routing modules. Each test cell generating trunk generates a test cell having a tag at the head end and inputs the test cell to the asynchronous transfer mode channel. The tag stores test cell data for test cell identification and for specifying the passage of a predetermined path in the asynchronous transfer mode channel.

The test cell detectors are provided respectively in the switches forming the asynchronous transfer mode channel. Each test cell detector detects, as a maintenance scan signal, whether or not the test cell is switched.

The controller tests the switches on a path corresponding to the test cell data stored in a test cell by judging, in synchronization with test cell generation, whether or not the test cell detectors of the switches of the path detect maintenance scan signals.

The above described first form of this invention enables switches to be tested under actual operation without interrupting channel processing, e.g. by inputting a test cell to an asynchronous transfer mode channel at a free cell timing on an input highway.

Because each test cell generating trunk generates test cells having tags at the headers storing test cell data collectively specifying the passages of all switches in the asynchronous transfer mode channel relevant to the input highway connected to the test cell generating trunk, and because the controller collect all maintenance scan signals from the test cell detectors in the respective switches, it becomes possible to perform efficient tests.

The above described first form of this invention enables an asynchronous transfer mode channel to be efficiently tested, even when the channel has a complex configuration, such that the channel is a multistage self-routing module with self-routing modules each having switches connected in plural stages.

The controller enables a simple control to test switches with ease, e.g. by judging whether or not the test cell detector of a switch on a path corresponding to the test cell data stored in a test cell detects a maintenance scan signal in a predetermined time period after the test cell is generated.

A second form of this invention utilizes test cell generators and test cell checkers.

The test cell generators are provided for respective input highways. Each test cell generator sequentially generates a plurality of test cells. The test cells are switched at crossing points in all self-routing modules, where cells inputted from the input highway corresponding to the test cell generator pass through. The test cells have test cell identification data for identifying the test cells and the input highway identification data.

The test cell checkers are provided for respective output highways. A test cell checker checks whether or not a predetermined number of test cells corresponding to the number of paths on all self-routing modules, through which cells inputted from each of the input highways pass to be outputted to each of the output highways, by extracting by test cell identification data test cells from cells outputted from self-routing modules to respective output highways and by extracting input highway identification data from the extracted test cells.

The above described second form of this invention enables an asynchronous transfer mode channel to be tested with ease by simply counting the numbers of test cells from respective input highways, without having to collect information from respective crossing points in self-routing modules regarding whether or not the crossing points switch test cells.

In this case, the test cell generators and the test cell monitors respectively need to be provided only for the number of the input highways and output highways, and their configurations are simple. Therefore, a configuration far simpler than a conventional configuration, where all crossing points in the self-routing modules have test cell detectors, realizes a channel testing.

A third form of this invention utilizes test cell generating trunks, loopback parts.

The test cell generating trunks are provided on the input side of an asynchronous transfer mode channel. Each test cell generating trunk generates a test cell whose header has a test cell indication bit for test cell identification and supplies it to the asynchronous transfer mode channel.

The turnaround parts are provided respectively in the ordinary trunks respectively connecting external transmission paths and asynchronous transfer mode channels. Each loopback part extracts by test cell indication bits test cells from cells transmitted through an asynchronous transfer mode channel, and loops the extracted test cells back to the test paths in the asynchronous transfer mode channel.

Here, each test cell generating trunk stores in the payloads of test cells path selection data specifying the test paths in the asynchronous transfer mode channel. In addition to the above configuration, a tag operator can be provided between the loopback parts and the asynchronous transfer mode channel. The tag operator replaces the tags attached to the head ends of the test cells looped back by the loopback part in an ordinary trunk with others based on the route selection data stored in the payloads of the test cells, and then supplies the reconfigured test cells to the asynchronous transfer mode channel.

Further, each test cell generating trunk stores in the payloads of test cells path selection data specifying the test paths, terminated at the test cell generating trunk, in the asynchronous transfer mode channel.

In addition to the above configuration, a controller for testing an asynchronous transfer mode channel can be provided at the test cell generating trunk. It judges whether or not test cells generated by the test cell generating trunk return to the test cell generating trunk. It compares the contents of the test cells generated from the test cell generating trunk with the contents of the test cells returned to the test cell generating trunk.

The above described third form of this invention enables an asynchronous transfer mode channel to be tested with lesser hardware comprising only a test cell generating trunk and loopback parts respectively provided in ordinary trunks, because test cells generated from a test cell generating trunk are sequentially looped back in the loopback parts in ordinary trunks to be returned finally to the test cell generating trunk.

A fourth form of this invention utilizes test cell inserters, test cell attachers and test cell checkers.

The test cell inserters are provided for respective input highways. Each test cell inserter sequentially generates a plurality of test cells to be multiplexed on its corresponding input highway. The test cells carry virtual identifiers in their headers and test data in their payloads.

The test cell tag attachers are provided for respective input highways. Each test cell tag attacher attaches tags to test cells multiplexed over the corresponding input highway by its corresponding test cell inserter. A tag enables the test cells to be switched at any desired crossing point in a self-routing module.

The test cell checkers are provided for respective output highways. Each test cell checker extracts a test cell by recognizing a virtual identifier carried in the header of a cell outputted from the self-routing module to the corresponding output highway, and examines the test data carried in the payload of the extracted test cell.

The above described fourth form of this invention enables a test cell inserter to multiplex test cells over to the corresponding input highway without interfering with its ordinary cell transmissions.

Each test cell tag generator sequentially generates tags and attaches them to the corresponding test cells. The tags enable all appropriate crossing points in respective self-routing modules to switch the test cells.

Each test cell inserter attaches e.g. consecutive values as test data to respective octets of the payload of a test cell. A test cell supervisor examines whether or not the test data attached to respective octets of the payload of an extracted test cell are the consecutive values. This enables a detailed examination to be made as to whether or not respective crossing points normally switch all the cell data, in particular as to whether or not respective crossing points do not cause the cell data to have a data error, and as to whether or not respective crossing points discard a cell.

BRIEF DESCRIPTION OF THE DRAWINGS

Those skilled in the art can easily understand additional objects and features of this invention from the description of the preferred embodiments and the attached drawings. In the drawings;

FIG. 7 shows the configuration of a switch in an SRM in the first preferred embodiment;

FIG. 8A shows the data configuration of an ATM cell in the first preferred embodiment;

FIG. 8B shows the configuration of the tag of an ATM cell shown in FIG. 8A;

FIG. 15 shows the tag data combinations in tags attached to test cells in the second preferred embodiment;

DESCRIPTION OF THE PREFERRED EMBODIMENTS

Explanation of the Underlying Principles

Before describing the preferred embodiments of this invention in detail, its underlying principles are explained.

A First Form

Figure 3:
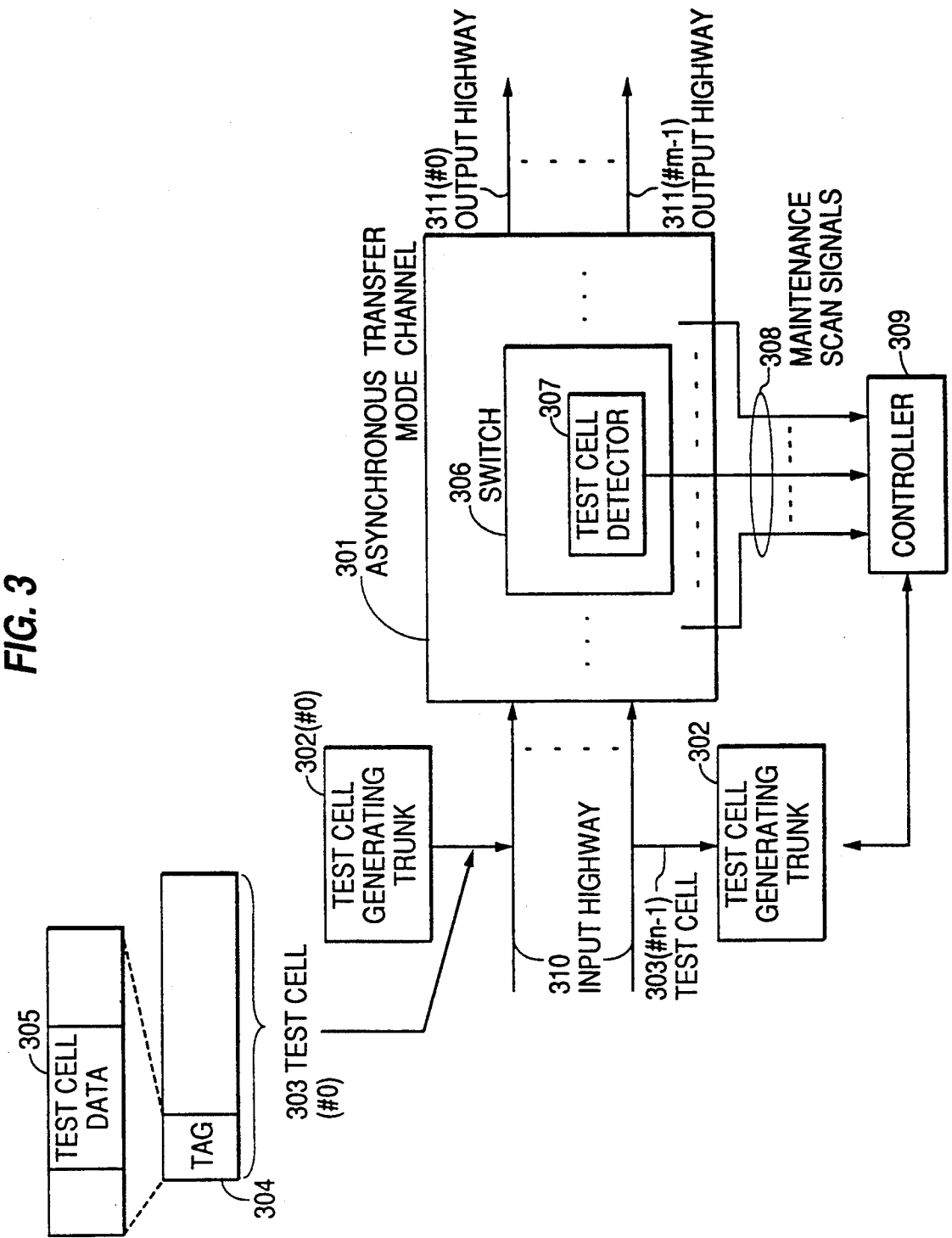
FIG. 3 is a schematic view for explaining a first form of this invention.

FIG. 3 is a schematic view for explaining a first form of this invention.

Test cell generating trunks 302, #0 through #n−1, are provided respectively on the input highways 310, #0 through #n−1, (where n is an integer) on the input side of an asynchronous transfer mode channel 301. The test cell generating trunks 302, #0 through #n−1, respectively generate test cells 303, #0 through #n−1, respectively having tags 304, #0 through #n−1, at the head ends, and input the test cells 303, #0 through #n−1, to the asynchronous transfer mode channel 301. The tags 304, #0 through #n−1, store test cell data 305, #0 through #n−1, for identifying test cells 303, #0 through #n−1, and for specifying the passage of a predetermined path in the asynchronous transfer mode channel 301.

Here, the asynchronous transfer mode channel 301 is a multistage self-routing channel e.g. having plural stages of self-routing modules. As shown in FIG. 3, it switches a cell inputted from any of the input highways 310, #0 through #n−1, and outputs it to one of the output highways 311, *0 through *m−1.

The test cell generating trunks 302, #0 through #n−1, multiplex the test cells 303, #0 through #n−1, respectively on the input highways 310, #0 through #n−1, connected to the input side of the asynchronous transfer mode channel 301 at their free cell timings.

As already stated, the test cell generating trunks 302, #0 through #n−1, generate test cells 303, #0 through #n−1, respectively having tags 304, #0 through #n−1, at the head ends, and input the test cells 303, #0 through #n−1, to the asynchronous transfer mode channel 301. The tags 304, #0 through #n−1, respectively store the test cell data 305, #0 through #n−1, for identifying the test cells 303, #0 through #n−1, and for specifying their passages of all switches 306, No. 1-1 through No. i-j, in the asynchronous transfer mode channel 301, which are relevant to the input highways 310, #0 through #n−1, respectively on the test cell generating trunks 302, #0 through #n−1.

Test cell detectors 307, No. 1-1 through No. i-j, are provided respectively in the switches 306, No. 1-1 through No. i-j, forming the asynchronous transfer mode channel 301. The test cell detectors 307, No. 1-1 through No. i-j, detect, as maintenance scan signals 308, No. 1-1 through No. i-j, whether or not their switches 306, No. 1-1 through No. i-j, switch the test cells 303, #0 through #n−1.

A controller 309 tests the switches 306, No. 1-1 through No. i-j, on paths corresponding to the test cell data stored in test cells 303, #0 through #n−1, by judging, synchronously with generating test cells 303, #0 through #n−1, whether or not the test cell detectors 307, No. 1-j through No. i-j, respectively in the switches 306, No. 1-1 through No. i-j, on the paths detect maintenance scan signals 308, No. 1-1 through No. i-j.

The controller 309 tests switches 306, No. 1-1 through No. X-j, on the paths corresponding to the test cell data 305, #0 through #n−1, stored in the test cells 303, #0 through #n−1, e.g. by judging whether or not the test cell detectors 307, No. 1 through No. X, of the switches 306, No. 1-1 through No. i-j, on the paths detect the maintenance scan signals 308, No. 1-1 through No. i-j, in predetermined time periods after the test cells 303, #0 through #n−1, are generated. The controller 309 is e.g. the central controller of the ATM exchanger.

The above described configuration shown in FIG. 3, where the input highways 310, #0 through #n−1, connected to the input side of the asynchronous transfer mode channel 301 respectively have the test cell generating trunks 302, #0 through #n−1, enable switches 306, No. 1-1 through No. i-j, to be tested under actual operation without interrupting channel processing, e.g. by multiplexing test cells 303, #0 through #n−1, on the input highways 310, #0 through #n−1, at a free cell timing.

The test cell generating trunks 302, #0 through #n−1, generate test cells 303 having tags 304 at the head ends storing test cell data 305 collectively specifying the passages of all switches 306, No. 1-1 through No. i-j, in the asynchronous transfer mode channel 301 relevant to the input highways 310, #0 through #n−1, connected to the test cell generating trunks 302, #0 through #n−1. The controller 309 collect all maintenance signals 308, No. 1-1 through No. i-j, from the test cell detectors 307, No. 1-1 through No. i-j, respectively in the switches 306, No. 1-1 through No. i-j. These operations enable tests to be performed efficiently.

The above described configuration shown in FIG. 3 enables an asynchronous transfer mode channel to be efficiently tested, even when the asynchronous transfer mode channel 301 has a complex configuration, such that the asynchronous transfer mode channel 301 is a multistage self-routing module with self-routing modules each having switches 306, No. 1-1 through No. i-j, connected in plural stages and rows.

The controller 309 enables a simple control to test switches 306 with ease, e.g. by judging whether or not the test cell detectors 307, No. 1-1 through No. i-j, respectively in the switches 306, No. 1-1 through No. i-j, on paths corresponding to the test cell data 305, #0 through #n−1, stored respectively in test cells 303, #0 through #n−1, detect maintenance scan signals 308, No. 1-1 through No. i-j, in a predetermined time period after the test cells 303, #0 through #n−1, are generated.

A Second Form

Figure 4A:
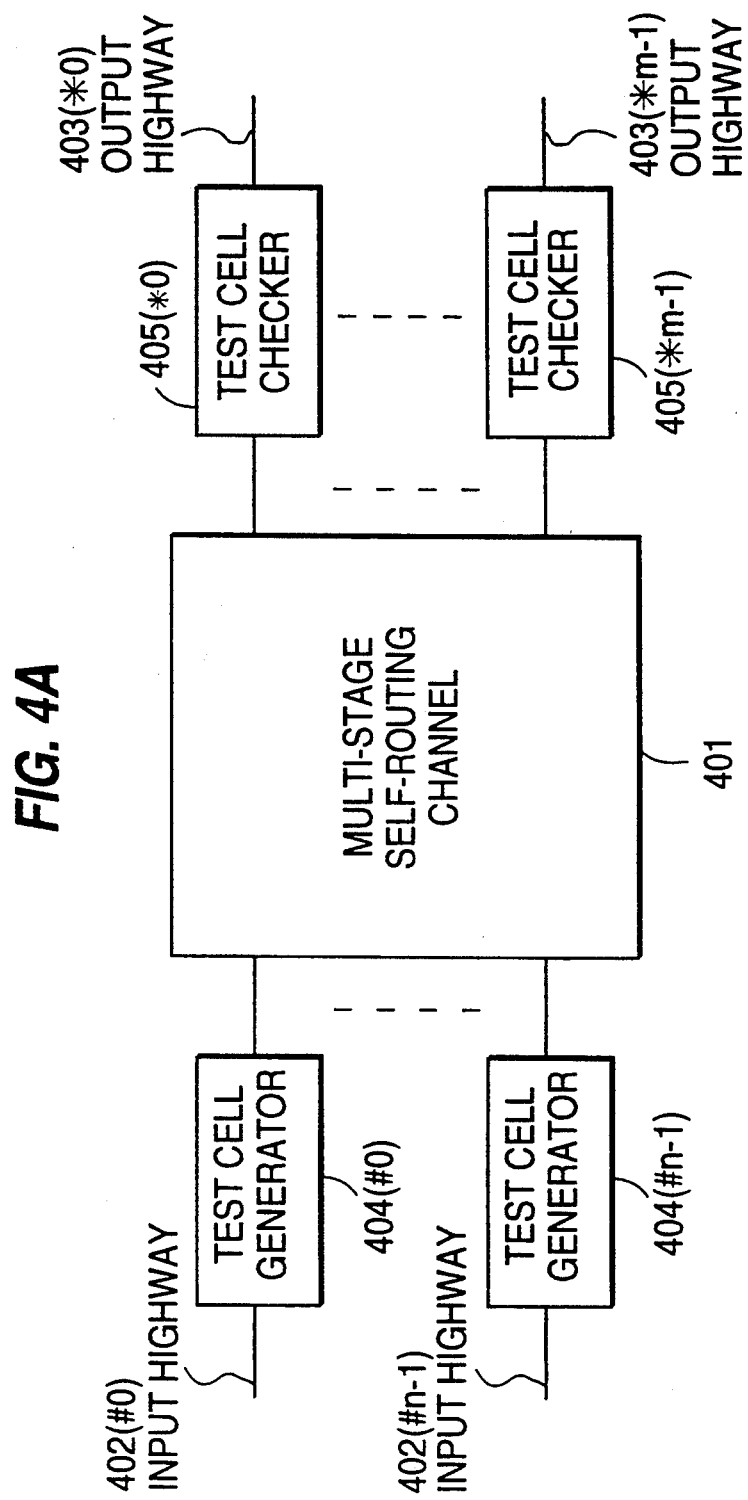
FIG. 4A is a schematic view for explaining a second form of this invention.
Figure 4B:
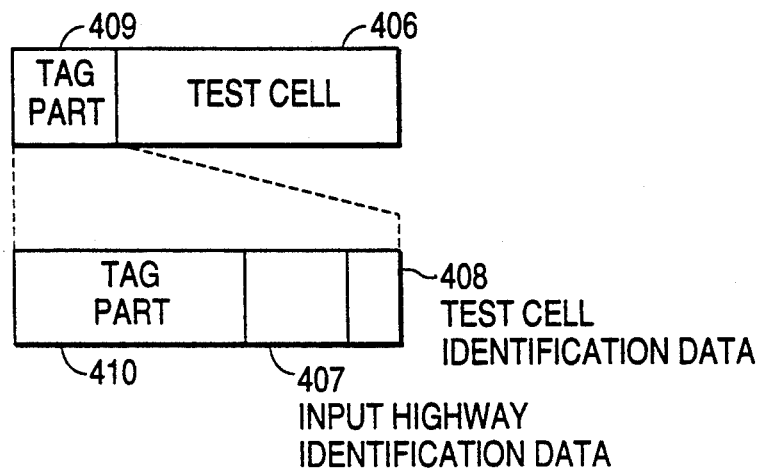
FIG. 4B shows the data structure of a test cell in the second form of this invention.

FIG. 4A is a schematic view for explaining a second form of this invention, and FIG. 4B shows the data structure of a test cell in the second form of this invention.

The second form of this invention is premised on an apparatus for testing ATM channels comprising a multistage self-routing module 401 connected in plural stages, for switching for connection respective cells inputted from any of a plurality (#0 through #n−1, where n is an integer) of input highways 402 to any of a plurality (*0 through *m−1, where m is an integer) of output highways 403.

Test cell generators 404, #0 through #n−1, are provided for respective input highways 402, #0 through #n−1. The test cell generators 404, #0 through #n−1, respectively generate a plurality of test cell groups 406,

0 through #n−1. The test cell groups 406, #0 through #n−1, are switched at crossing points in all self-routing modules, where cells inputted from the input highways 402, #0 through #n−1, connected respectively to the test cell generators 404, #0 through #n−1, may pass through. The test cell groups 406, #0 through #n−1, respectively have test cell identification data 408, #0 through #n−1, for test cell identification and the input highway identification data 407, #0 through #n−1.

The test cell generators 404, #0 through #n−1, are provided respectively e.g. in virtual channel converters for converting pairs of virtual identifiers (each comprising a virtual path identifier and a virtual channel identifier) into tag data 410, #0 through #n−1. As shown in FIG. 4B, the tag data 410, #0 through #n−1, for enabling crossing points in all self-routing modules, which cells inputted from the input highways 402, #0 through #n−1, may pass through, to switch the cells are attached respectively to tags 409, #0 through #n−1, at the head ends of plural test cell groups 406, #0 through #n−1, generated by the test cell generators 404, #0 through #n−1. Input highway identification data 407, #0 through #n−1, are attached to free regions in the tags 409, #0 through #n−1, at the head end of the test cell groups 406, #0 through #n−1, e.g. as shown in FIG. 4B.

Test cell checkers 405, *0 through *m−1, are provided respectively for output highways 403, *0 through *m−1. The test cell checkers 405, *0 through *m−1, extract by test cell identification data 408, #0 through #n−1, test cell groups 406, #0 through #n−1, from cells outputted from the multistage self-routing module 401 respectively to output highways 403, *0 through *m−1, and by extracting input highway identification data 407, #0 through #n−1, from the extracted test cell groups 406, #0 through #n−1. The test cell checkers 405, *0 through *m−1, check with a predetermined number of test cell groups 406 corresponding to the number of paths on the entire multistage self-routing module 401, as to which cells inputted from each of the input highways 402, #0 through #n−1, may pass through to be outputted to the output highways 403, *0 through *m−1.

The test cell checkers 405, *0 through *m−1, tests the multistage self-routing modules 401 by checking whether or not a predetermined number of test cell groups 406, #0 through #n−1, respectively from the input highways 402, #0 through #n−1, are detected in a predetermined period of time e.g. after the test cell generators 404, #0 through #n−1 start generating test cell groups 406, #0 through #n−1.

In the configuration shown in FIG. 4A, when the multistage self-routing module 401 has a determinate configuration, the number of paths through which a cell inputted from one of the input highways 402, #0 through #n−1, to be outputted to one of the output highways 403, *0 through *m−1, via the multistage self-routing module 401 is of a determinate number.

Hence, the test cell generators 404, #0 through #n−1, respectively on the input highways 402, #0 through #n−1, generate test cell groups 406, #0 through #n−1, so that they collectively pass through all possible paths, and attach to respective test cell groups 406, #0 through #n−1, the input highway identification data 407, #0 through #n−1, indicating which ones of the input highways 402, #0 through #n−1, supply the test cell groups 406, #0 through #n−1. The test cell checkers 405, *0 through *m−1, respectively on the output highways 403, *0 through *m−1, recognize the input highway identification data 407, #0 through #n−1, attached respectively to the test cell groups 406, #0 through #n−1, verified as test cell groups 406, #0 through #n−1, by test cell identification data 408, #0 through #n−1. Then, the test cell checkers 405, *0 through *m−1, test the self-routing modules in the multistage self-routing module 401 (forming an ATM channel) by checking whether or not a predetermined number of the test cell groups 406, #0 through #n−1, corresponding respectively to the input highways 402, #0 through #n−1, are detected in predetermined time periods e.g. respectively after the test cell generators 404, #0 through #n−1, start generating the test cell groups 406, #0 through #n−1.

The above described configuration of the second form shown in FIG. 4A enables an asynchronous transfer mode channel to be tested with ease by simply counting the numbers of the test cells (in each of the test cell groups 406, #0 through #n−1) respectively from the input highways, #0 through #n−1, without having to collect information respectively from the crossing points in all self-routing modules (of the multistage self-routing module 401) regarding whether or not the crossing points switch the test cells.

A Third Form

Figure 5A:
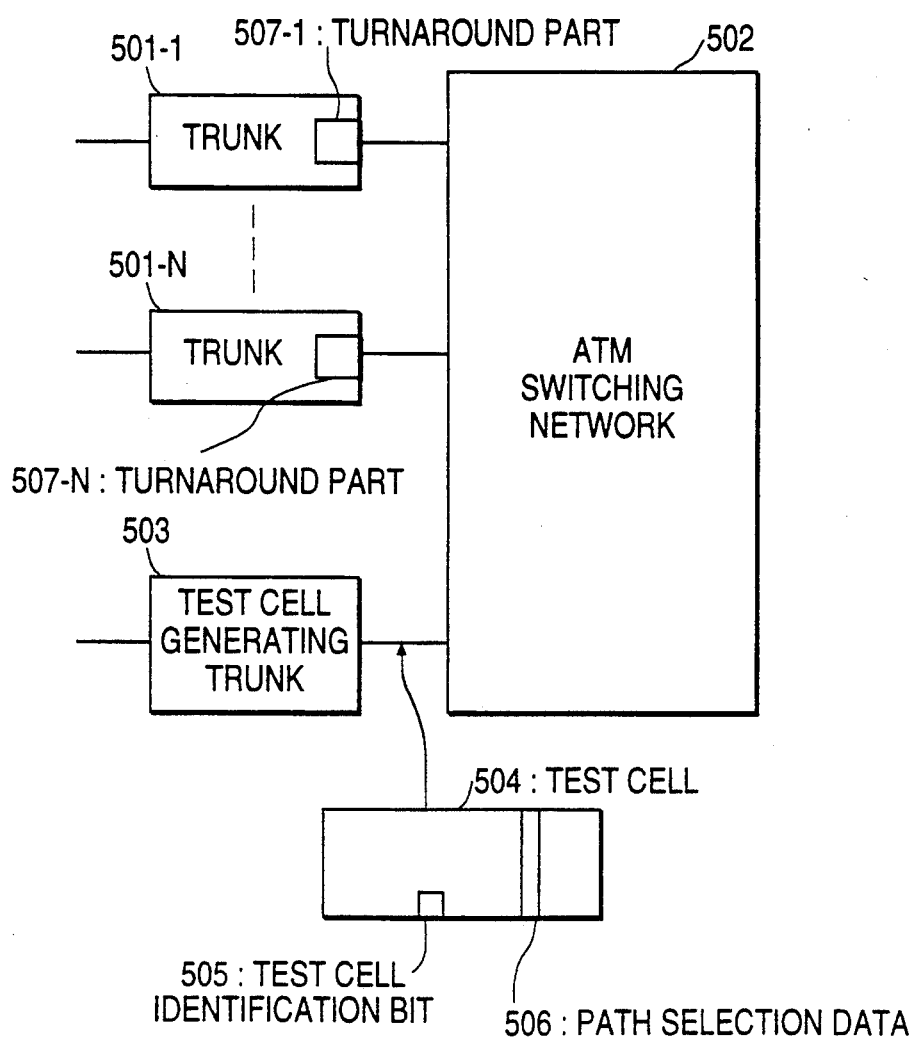
FIG. 5A is a schematic view for explaining a third form of this invention.

FIG. 5A is a schematic view for explaining a third form of this invention.

501-1 through 501-N are plural trunks for interfacing with other offices. 502 is an ATM switching network. 503 is a test cell generating trunk. 504 is a test cell outputted from a test cell generating trunk 503. 505 is a test cell indication bit in the test cell 504 for test cell identification. 506 is a path selection data for specifying the path to be tested.

The loopback parts 507-1 through 507-N are provided respectively in the trunks 501-1 through 501-N, which connect external transmission paths with ATM switching network 502. When the test cell indication bit 505 in the test cell 504 are detected from cells transmitted through the ATM switching network 502, the loopback parts 507-1 through 507-N loop back the extracted test cell 504 to the paths to be tested in the ATM switching network 502.

The test cell generating trunk 503 is provided on the input side of the ATM switching network 502. It generates the test cell 504 whose header has the test cell identification bit 505 for test cell identification and supplies it to the ATM switching network 502.

Upon receipt of the test cell 504 and detection of the test cell identification bit 505, the loopback part 507-i in the trunk 501-i ($1 \leq i \leq N$), the loopback part 507-i loops back the extracted test cell 504 to the paths to be tested corresponding to the path selection data 506 attached to the received test cell 504.

By judging whether or not the ATM switching network 502 returns the test cell 504 to the test cell generating trunk 503, which generates the test cell 504, in a predetermined time period, it can be tested whether or not the paths set for the test cell 504 are normal.

A Fourth Form

Figure 5B:
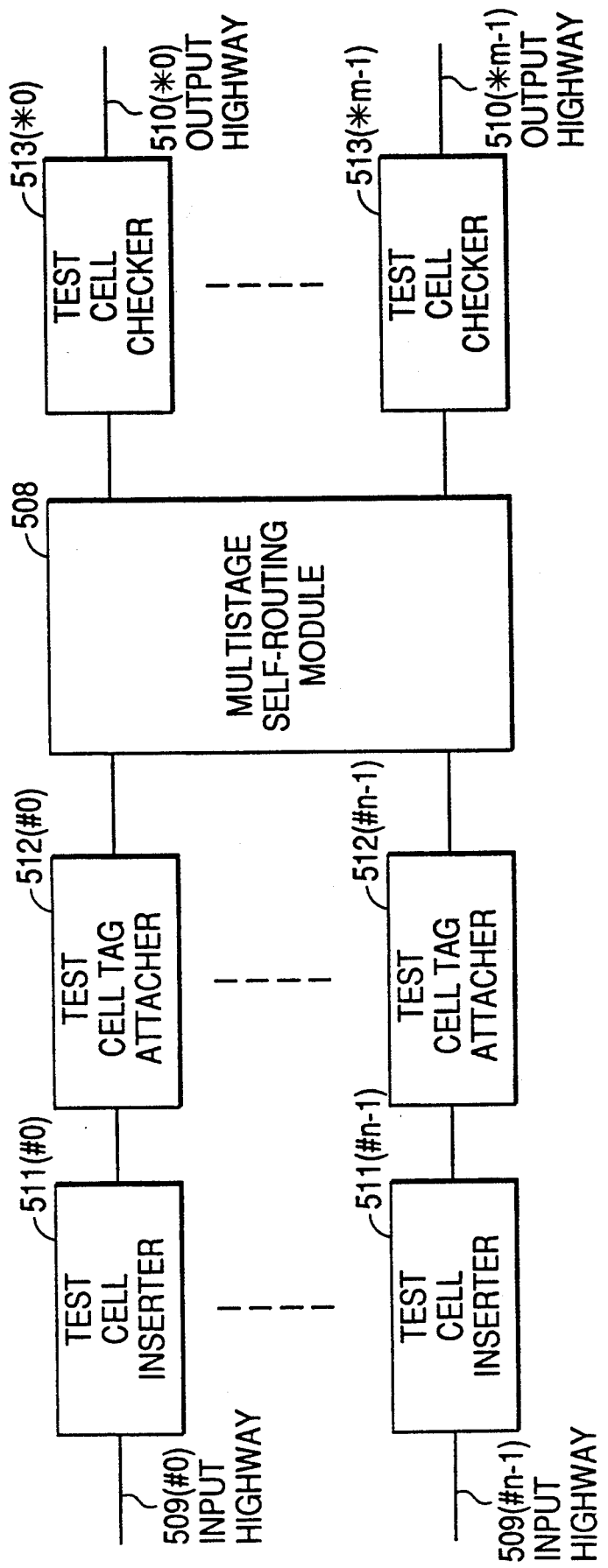
FIG. 5B is a schematic view for explaining a fourth form of this invention.

FIG. 5B is a schematic view for explaining a fourth form of this invention.

As with the second form of this invention, the fourth form of this invention is premised on an apparatus for testing ATM channels comprising a multistage self-routing module 508 connected in plural stages, for switching for connection respective cells inputted from any of a plurality (#0 through #n−1, where n is an integer) of input highways 509 to any of a plurality (*0 through *m−1, where m is an integer) of output highways 510.

Test cell inserters 511, #0 through #n−1, are provided respectively for input highway highways 509, #0 through #n−1. The test cell inserters 511, #0 through #n−1, sequentially generate a plurality of test cells by attaching, to their headers, corresponding pairs of virtual identifiers, each comprising a VPI (virtual path identifier) and a VCI (virtual channel identifier), for test cell identification and, to their payloads, test data, and multiplex them over the input highways 509, #0 through #n−1. In this case, the test cell inserters 511, #0 through #n−1 attach, to respective octets of the payloads of a predetermined number of test cells generated consecutively, test data e.g. sequentially incrementing or decrementing consecutive values. The test cell inserters 511, #1 through #n−1, also multiplex one (1) test cell each, each time non-test cells pass respectively through the input highways 509, #0 through #n−1.

Test cell tag attachers 512, #0 through #n−1, are also provided respectively for the input highways 509, #0 through #n−1. The test cell tag attachers 512, #0 through #n−1 attach tags to the test cells multiplexed respectively by the test cell inserters 509 over the input highways 509, #0 through #n−1. The tags enable the test cells to be switched at any specified crossing points in the multistage self-routing module 508. the test cell attachers 512, #0 through #n−1, are provided e.g. in a VCC (virtual channel converter) for converting pairs of virtual identifiers (each comprising a VPI and a VCI) to tag data. The test cell attachers 512, #0 through #n−1, sequentially generates tags for enabling switching operations to be performed at all crossing points in the multistage self-routing module 508. When the test cell inserters 511, #0 through #n−1, consecutively multiplex a predetermined number of test cells respectively over to input highways 509, #0 through #n−1, the test cell tag attachers 512, #0 through #n−1, respectively attach the same tags to a group of the predetermined number of test cells.

Test cell checkers 513, *0 through *m−1, are provided respectively for output highways 510, *0 through *m−1. The test cell checkers 513, *0 through *m−1, extract test cells by recognizing the virtual identifiers attached to the headers of cells outputted respectively to the output highways 510, *0 through *m−1, from the multistage self-routing module 508, and examine the test data attached to the payloads of the extracted test cells. When the test cell inserters 511, #0 through #n−1, consecutively multiplex a predetermined number of test cells respectively over to the input highways 509, #0 through #n−1, and the test cell tag attachers 512, #0 through #n−1, attach the same tags to a group of the predetermined number of test cells, the test cell checkers 513, *0 through *m−1, examine payload abnormalities and losses of the test cells by judging whether or not the values of the test data stored in the head end octets of the payloads of the consecutively extracted test cells are sequentially incrementing or decrementing from the first extracted one.

In the fourth form of this invention described above, the test cell inserters 511, #0 through #n−1, multiplex a test cell for every predetermined number of cells respectively over to the input highways 509, #0 through #n−1, such that test cells do not interfere with ordinary cell transfers over the input highways 509, #0 through #n−1.

The test cell tag attachers 512, #0 through #n−1, sequentially generate tags and attach them to test cells, such that the test cells to which tags are attached are switched at all crossing points in the multistage self-routing module 508. This enables the normality of each of the crossing points in the multistage self-routing module 508 to be tested efficiently.

Further, the test cell inserters 511, #0 through #n−1, attach to the respective octets of payloads of the predetermined number of test cells test data having consecutive values starting from the first test cell. Then, the test cell tag attachers 512, #0 through #n−1, attach the same tags to the group of predetermined number of test cells. The test cell checkers 513, *0 through *m−1 judge whether or not the test data in the head end octets of the payloads of the consecutively extracted test cells comprise sequentially incrementing or decrementing consecutive values starting from the first test cell. This enables payload abnormalities and losses of the test cells to be examined.

DETAILED DESCRIPTION OF THE PREFERRED EMBODIMENTS

A First Preferred Embodiment

Figure 6:
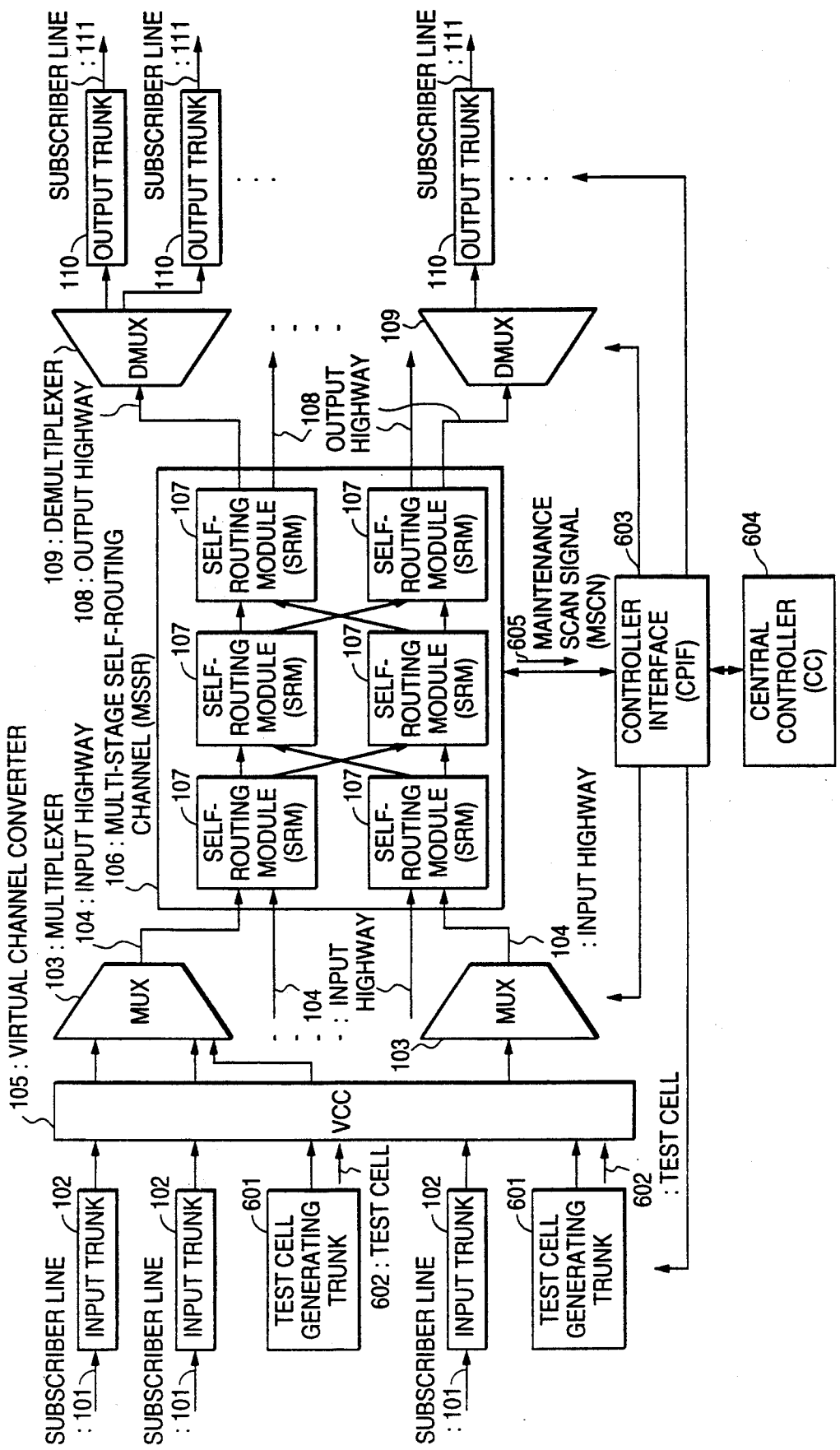
FIG. 6 is a block diagram of a first preferred embodiment of this invention.

FIG. 6 is a block diagram of a first preferred embodiment of this invention.

The configuration of an ATM exchanger shown in FIG. 6 corresponds to that shown in FIG. 3, which is a schematic view for explaining a first form of this invention.

Figure 1:
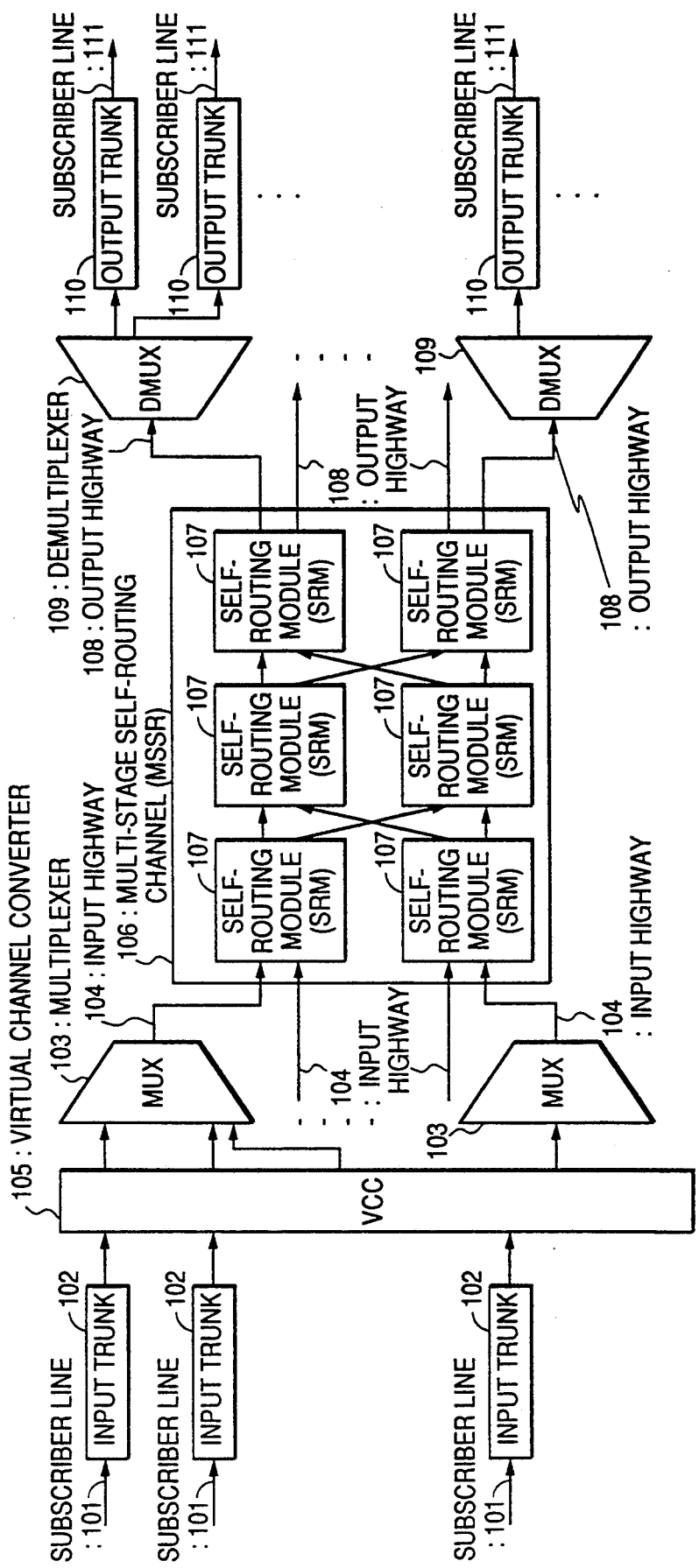
FIG. 1 is a schematic view of a generic ATM exchanger.

In FIG. 6, the parts which have the same numbers as those in FIG. 1, which shows a prior art configuration, have the same functions.

What the first preferred embodiment is different from the prior art shown in FIG. 1 is that test cell generating trunks 601, in addition to the ordinary trunks 102, are connected to the respective MUXs 103 for multiplexing their outputs to the respective input highways 104 through the VCC 105. The test cell generating trunks 601 generates test cells 602 to be multiplexed over the respective input highways 104 at their free cell timings.

FIG. 7 shows the configuration of a switch 201 in an SRM 107 in the first preferred embodiment shown in FIG. 6. (Refer to FIG. 2.)

First, a header checker 701 recognizes the tag of an inputted ATM cell, and stores the ATM cell in a buffer 702 when it judges that the ATM cell must be switched by the switch to which the header checker 701 belongs to. The ATM cell thus stored in the buffer 702 is fed to a multiplexer (MUX) 703 to be multiplexed over an output side highway, thereby completing the switching operation for the ATM cell.

When the header checker 701 judges that an ATM cell must not be switched by the switch to which the header checker 701 belongs to, the ATM cell is sent to a next switch 201 through a line branching before the header checker 701.

A feature shown in FIG. 7 which is relevant to the first form of this invention is a maintenance scan (MSCN) collector 704. When a test cell 602 generated by the test cell generating trunk 601 shown in FIG. 6 is written into the buffer 702, the MSCN 704 detects such a state as an MSCN signal 605, and notifies a central controller (CC) 604 through a controller interface (CPIF) 603 shown in FIG. 6.

FIG. 8A shows the data configuration of an ATM cell in the first preferred embodiment.

An ATM cell has ordinarily the following data structure.

As shown in FIG. 8A, an ATM cell has a payload or information part 802, having a data length of forty-eight (48) octets, for storing payload or information data. An ATM cell also has a header 801, having a data length of five (5) octets, for storing a VCI and a VPI (the address information for the receiving side subscriber), a CRC code for error correction, information e.g. on payload type and cell loss priority for discarding the cell during a congestion. An ATM cell also has a tag 803, having a data length e.g. of two (2) octet, for storing information of the path in the MSSR 106 over which the ATM cell should be routed, to be outputted to the destined one of the output highways 108. The VCC 105 shown in FIG. 6 attaches the tag 803 to the ATM cells it receives.

FIG. 8B shows the configuration of the tag 803 shown in FIG. 8A.

A tag 803 has three (3) stages of two (2) bit tag data 804 for having the respective switches 201 (Refer to FIG. 2.) in each of the three (3) stage SRMs 107 select ATM cells. In addition, the tag 803 has test cell data 805 identifying that an ATM cell containing the test cell data 805 is a test cell. On the other hand, the tag 803 of an ATM cell inputted from any of the subscriber lines 101 to the corresponding one of the input trunks 102 do not have the test cell data 805.

The operation of the first preferred embodiment having the above configuration is explained below.

Figure 2:
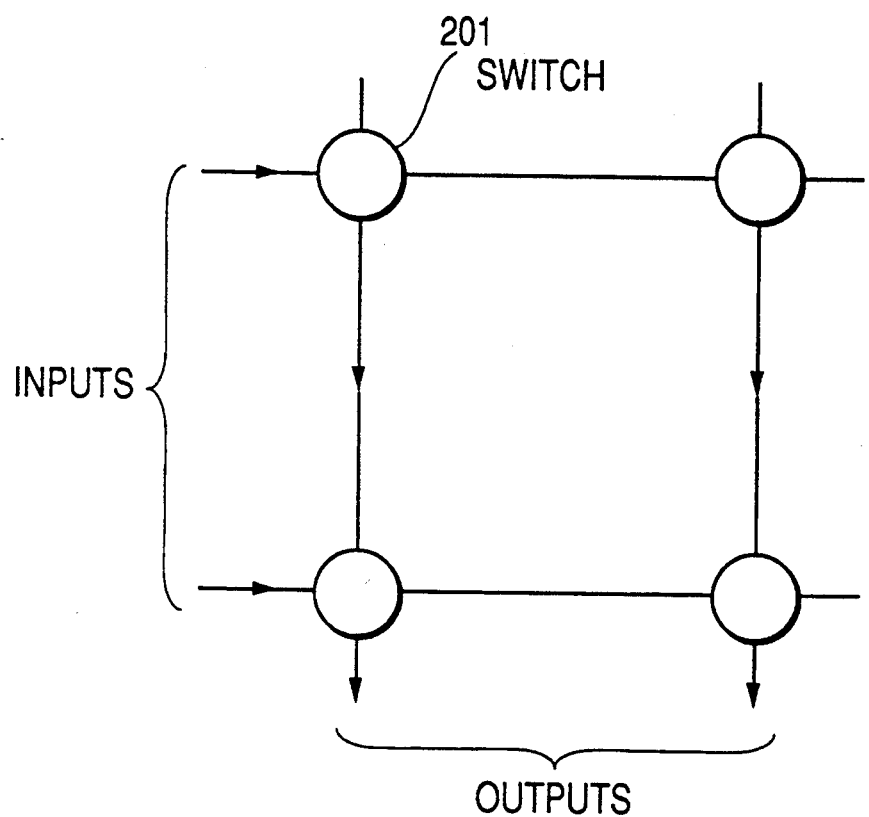
FIG. 2 shows an exemplary configuration of one of the SRMs shown in FIG. 1.

In the first preferred embodiment, the switches 201, shown in FIGS. 2 and 7, respectively in the SRMs 107 of the MSSR 106 are tested by the test cells 602 generated by the test cell generating trunk 601 shown in FIG. 6.

The CC 604 shown in FIG. 6 instructs through the CPIF 603 those of the test cell generating trunks 601 connected to predetermined ones of input highways 104 to generate test cells. Such an instruction is executed by a maintenance command called a maintenance signal distributor (MSD).

Upon receiving the instruction, the test cell generating trunks 601 multiplexes the test cells 602 having the data structure shown in FIGS. 8A and 8B over the corresponding input highways 104. In this case, the test cell data 805 having test cell identification data are attached to the tag 803 shown in FIG. 8B, as described above.

Here, the ATM exchanger may use a synchronous optical network (SONET) as a transmitting means. A SONET frame contains data, such as a section overhead and a path overhead, unnecessary for the switching in the MSSR 106. The timings at which such unnecessary data are multiplexed can be used for free time slots (invalid data cell timings having the same lengths as ordinary cells). When only a few data need to be transmitted over the input highways 104, there are necessarily some empty cell timings. In the first preferred embodiment, such free cell timings are used for multiplexing the test cells 602.

The corresponding one of the test cell generating trunks 601 notifies the CC 604 through the CPIF 603 of the emission of test cells 602, concurrently with multiplexing the test cells 602.

The header checker 701 (FIG. 7) in a switch 201 in one of the SRMs 107 shown in FIG. 6 recognizes the test cell data 805 in the tag 803 of the received ATM cell. When the tag 803 contains the test cell data 805, the buffer 702 unconditionally stores the ATM cells as test cells 602. The MSCN collector 704 shown in FIG. 7 detects the receipts of the test cells 602, and outputs the MSCN signal 605.

In response to this, the CC 604 activates a timer (not shown) on receiving a notification from the one of the test cell generating trunks 601 of the emission of the test cells 602. Then, the CC 604 watches whether or not the MSCN signals 605 are received through the CPIF 603 from all switches 201 relevant to the input highways 104 to which the test cells 602 are sent. Thus, the CC 604 tests the normality of the switches 201.

The above described testing operation is performed for all switches 201 (Refer to FIG. 2.) in the SRMs 107 of the MSSR 106 by having all test cell generating trunks 601 output test cells 602 to be multiplexed over the respective input highways 104, which are connected to the MSSR 106.

It is also possible to configure the ATM channel testing apparatus to have only one (1) of the test cell generating trunks 601 commonly for all the input highways 104 by reinputting test cells 602 outputted from one of the output highways 108 to one of the input highways 104 not yet tested.

In the first preferred embodiment, the header checker 701 recognizes the test cell data 805 (FIG. 8B) in the tag 803 (FIG. 8A) of the received ATM cell for identifying a test cell 602, which the buffer 702 stores unconditionally. Accordingly, all the switches 201 relevant to the specified one of the input highways 104 on which an ATM cell must be multiplexed detect the ATM cell. However, the first embodiment can be modified by attaching predetermined data to the free space in the tag 803 shown in FIG. 8B, so that only the switch 201 on a predetermined path detects the test cell 602. There are other controlling methods for the variants of the first form of this invention.

A Second Preferred Embodiment

Figure 9:
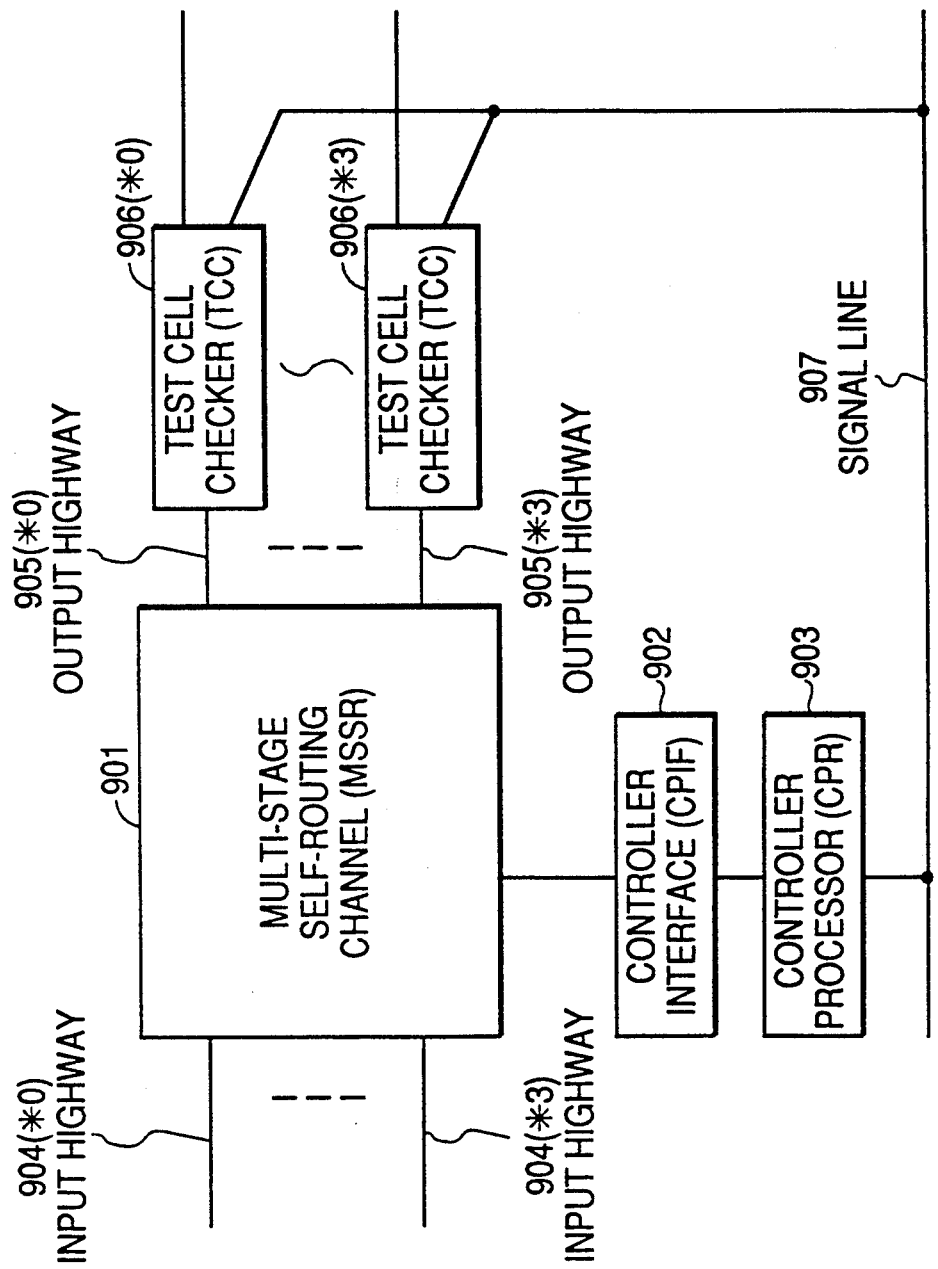
FIG. 9 is a block diagram of a second preferred embodiment of this invention.

FIG. 9 is a block diagram of a second preferred embodiment of this invention. This configuration of an ATM exchanger corresponds to that shown in FIG. 4A, which is a schematic view for explaining a second form of this invention.

A multistage self-routing channel (MSSR) 901 exchanges cells inputted from four (4) input highways 904, #0 through #3, and outputs them to four (4) output highways 905, *0 through *3. Here, the numbers of input highways and output highways need not be limited to four (4). A central processor (CPR) 903 connected through a controller interface (CPIF) 902 controls the MSSR 901. In addition, four (4) test cell checkers (TCC) 906, *0 through *3, connected respectively to the four (4) output highways 905, *0 through *3, detect the statuses regarding which one of the input highways 904, #0 through #3, supply how many test cells to which one of the output highways 905, *0 through *3, and notify the CPR 903 via a signal line 907 of the statuses.

Figure 10:
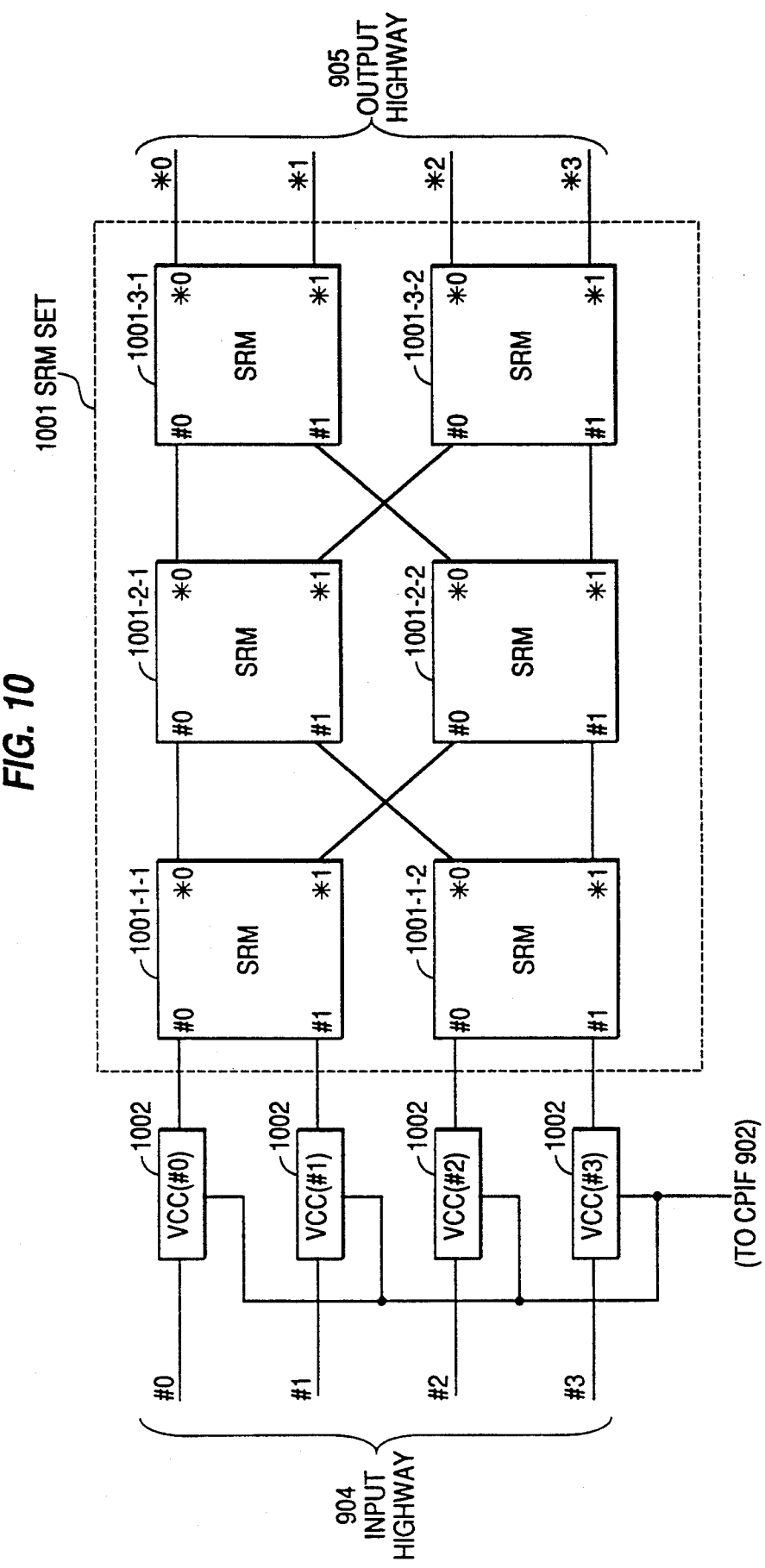
FIG. 10 shows the configuration of a multistage self-rouging module in the second preferred embodiment.

FIG. 10 shows the configuration of a multistage self-rouging module in the second preferred embodiment.

More specifically, FIG. 10 shows the configuration of the MSSR 901 shown in FIG. 9 for use in the second preferred embodiment.

The MSSR 901 corresponds to an SRM set 1001 inside the dashed line frame shown in FIG. 10, comprising six (6) SRMs 1001-1-1 through 1001-3-2, each switching cells supplied from either of its two (2) input lines 1101, #0 and #1, to either of its two (2) output lines 1102, *0 and *1, paired in three (3) stages. That is, three (3) SRM pairs 1001-1-1 and 1001-1-2, 1001-2-1 and 1001-2-2, and 1001-3-1 and 1001-3-2 are arrayed from the input highway side to the output highway side in a 2×3 configuration having two (2) rows and three (3) stages. Four (4) VCCs (virtual channel converters) 1002, #0 through #3, are connected respectively to the four (4) input highways 904, #0 through #3. VCC pairs #0 and #1 of 1002, and #2 and #3 of 1002 are connected respectively to the input lines 1101, #0 and #1, of the first stage SRMs 1001-1-1 and 1001-1-2. The functions of the VCCs 1002, #0 through #3, will be elaborated later.

Figure 11:
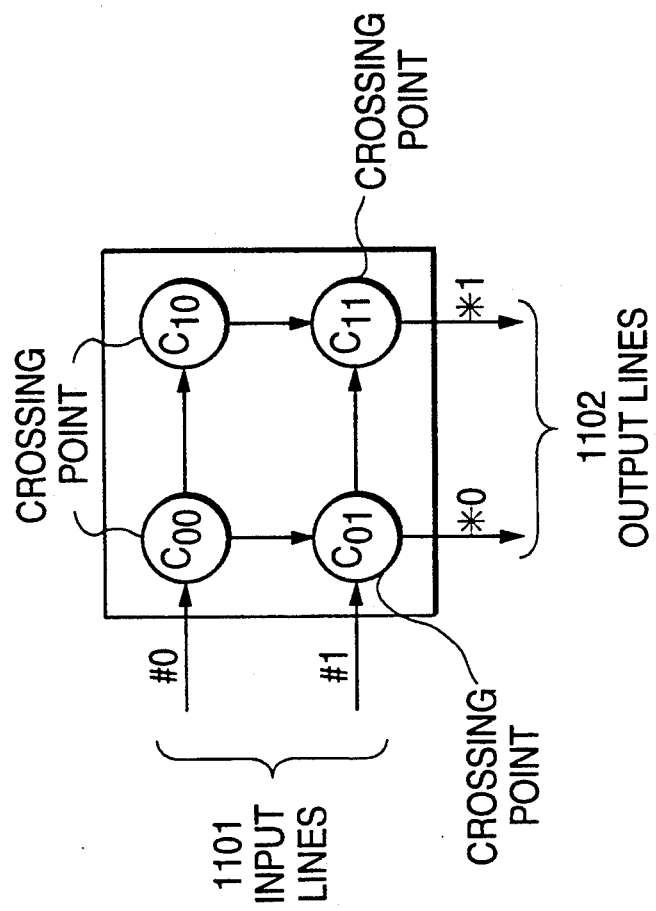
FIG. 11 shows the configuration of a self-routing module in the second preferred embodiment.

FIG. 11 shows the configuration of a self-routing module in the second preferred embodiment.

More specifically, FIG. 11 shows the configuration, which is common to all the SRMs 1001-1-1 through 1001-3-2 in the SRM set 1001 shown in FIG. 10. The configuration shown in FIG. 11 is similar to that shown in FIG. 2.

Four (4) crossing points $C_{00}$ through $C_{11}$ shown in FIG. 11 correspond to the switches 201 shown in FIG. 2. As shown in FIG. 11, an SRM in the SRM set 1001 switches cells supplied from two (2) input lines 1101, #0 and #1, to two (2) output lines 1102, *0 and *1. Crossing point $C_{00}$ or $C_{10}$ selectively outputs cells supplied from #0 of the input lines 1101 to *0 or *1 of the output lines 1102. Crossing point $C_{01}$ or $C_{11}$ selectively outputs cells supplied from #1 of the input lines 1101 to *0 or *1 of the output lines 1102. The configuration of the four (4) crossing points $C_{00}$ through $C_{11}$ will also be elaborated later.

Figure 12:
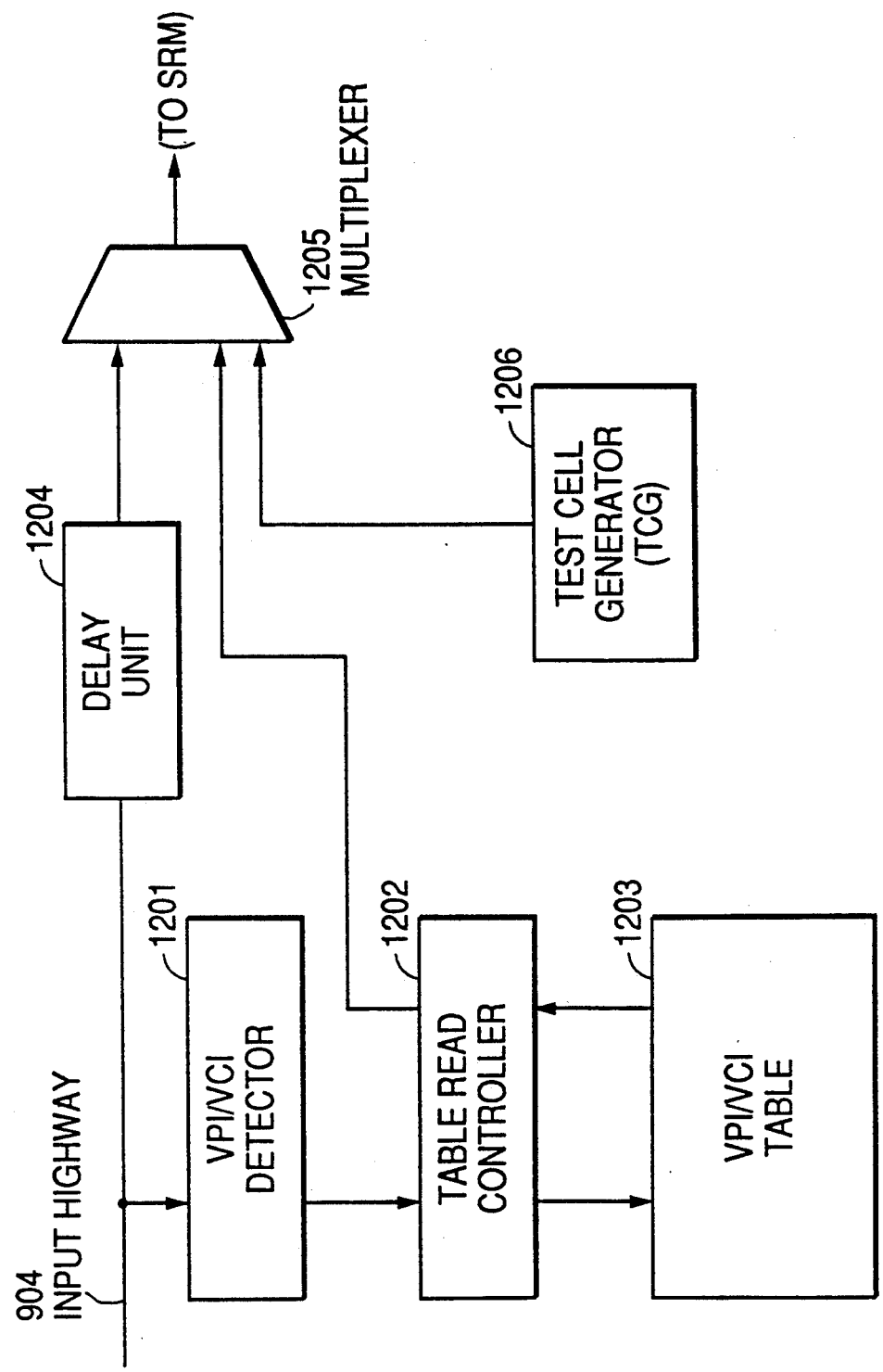
FIG. 12 shows the configuration of a virtual channel converter in the second preferred embodiment.

FIG. 12 shows the configuration of a virtual channel converter in the second preferred embodiment.

More specifically, FIG. 12 shows the configuration, which is common to all the VCCs 1002, #0 through #3, shown in FIG. 10.

VPI/VCI detectors 1201, #0 through #3, detect VPIs (virtual path identifiers) and VCIs (virtual channel identifiers) attached to the headers of cells supplied respectively from the input highways 904, #0 through #3.

Table read controllers 1202, #0 through #3, refer to VPI/VCI tables 1203, #0 through #3, by using the above VPIs and VCIs detected respectively by the VPI/VCI detectors 1201, #0 through #3, as the addresses, for reading the corresponding tag data.

Multiplexers 1205, #0 through #3, output cells delayed respectively by delay units 1204, #0 through #3, after attaching the corresponding tag data read respectively by the table read controllers 1202, #0 through #3, to the head ends of the cells. Here, the CPR 903 shown in FIG. 9 sets via the CPIF 902 in the VPI/VCI tables 1203, #0 through #3, the conversion tables for converting VPIs and VCIs into tag data.

Test cell generators (TCGs) 1206, #0 through #3, generate test cells (described later) for testing the MSSR 901 (FIG. 9). Multiplexers 1205, #0 through #3, multiplex the test cells respectively on free time slots of the input highways 904, #0 through #3.

Figure 13:
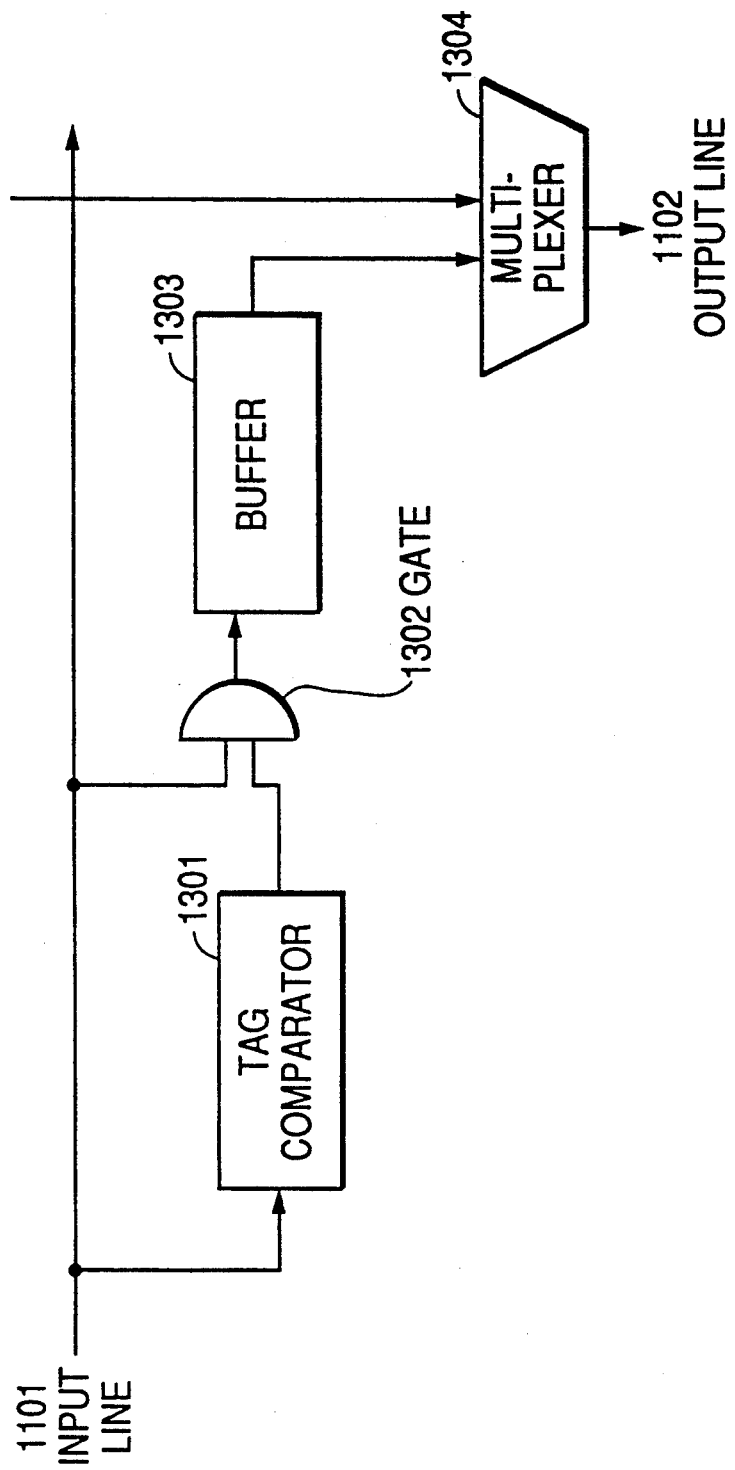
FIG. 13 shows the configuration of a crossing point in the second preferred embodiment.

FIG. 13 shows the configuration of a crossing point in the second preferred embodiment.

More specifically, FIG. 13 shows the configuration, which is common to all the crossing points $C_{00}$ through $C_{11}$ shown in FIG. 11.

A tag comparator 1301 detects the tags attached to the head ends of the cells supplied from #0 or #1 of the input lines 1101 (Refer to FIG. 11.) and judges whether or not to switch the cells at its own crossing point. Here, when it is judged to switch the cells at its own crossing point, a gate 1302 is turned on, and a buffer 1303 receives the cells inputted succeedingly to the tag data from #0 or #1 of the input lines 1101. Then, a multiplexer 1304 multiplexes the cells stored in the buffer 1303 on the free time slots of *0 or *1 of the output lines 1102. (Refer to FIG. 11.)

Figure 14:
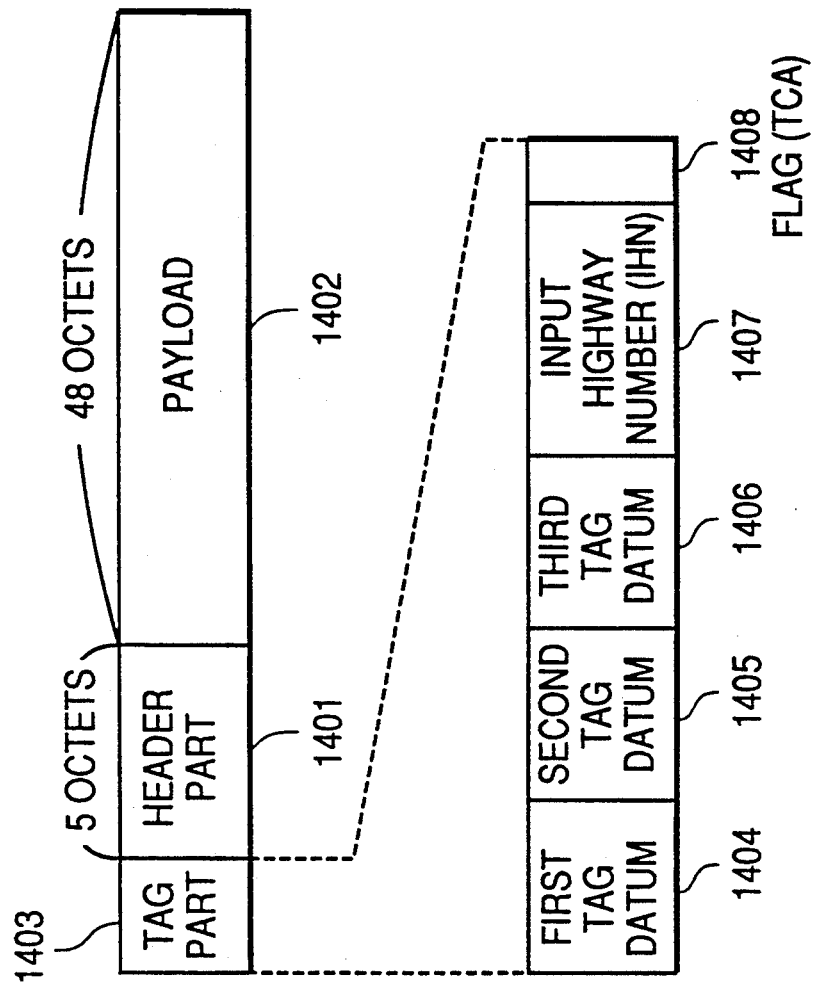
FIG. 14 shows the configuration of an ATM cell in the second preferred embodiment.

FIG. 14 shows the configuration of an ATM cell in the second preferred embodiment.

Each of the cells supplied from the input highways 904, #0 through #3, (shown in FIG. 9) comprises a payload or information part 1402 having a data length of forty-eight (48) octets for storing payload data and a header 1401 having a data length of five (5) octets for storing address data.

Each of the VCCs 1002, #0 through #3, (shown in FIGS. 10 and 12) attaches at the head end of the cell, i.e. before the header 1401, a tag 1403 having a data length e.g. of two (2) octets. The tag 1403 comprises a first tag datum 1404, a second tag datum 1405 and a third tag datum 1406 each with one (1) bit, in the second preferred embodiment. An actual ATM exchanger may assign a larger number of bits to each subdivision of a tag.

The first tag datum 1404 contains information specifying to which one of the output lines 1102, *0 and *1, SRM 1001-1-1 or SRM 1001-1-2 in the first stage of the MSSR 901 (shown in FIG. 10) switches its carrier cell. If the value is zero (0), the first tag datum 1404 specifies its carrier cell is to be switched to *0 of the output lines 1102. If the value is one (1), the first tag datum 1404 specifies its carrier cell is to be switched to *1 of the output lines 1102.

As with the first tag datum 1404, the second tag datum 1405 contains information specifying to which one of the output lines 1102, *0 and *1, SRM 1001-2-1 or SRM 1001-2-2 in the second stage of the MSSR 901 switches its carrier cell. If the value is zero (0), the second tag datum 1405 specifies that its carrier cell is to be switched to *0 of the output lines 1102. If the value is one (1), the second tag datum 1405 specifies its carrier cell is to be switched to *1 of the output lines 1102.

Also, as with the first tag datum 1404 and the second tag datum 1405, the third tag datum 1406 contains information specifying to which one of the output lines 1102, *0 and *1, SRM 1001-3-1 or SRM 1001-3-2 in the third stage of the MSSR 901 switches its carrier cell. If the value is zero (0), the third tag datum 1406 specifies its carrier cell is to be switched to *0 of the output lines 1102. If the value is one (1), the third tag datum 1406 specifies that its carrier cell is to be switched to *1 of the output lines 1102.

On receiving the data specified by the first tag datum 1404, the second tag datum 1405 and the third tag datum 1406, each crossing points $C_{00}$ through $C_{11}$ in each of the SRMs 1001-1-1 through 1001-3-2 (shown in FIG. 10) has its comparator 1301 (shown in FIG. 13) refer to the first tag datum 1404, the second tag datum 1405 or the third tag datum 1406, according to the stage of the SRM in the SRM set 1001 to which it belongs. If it is connected to *0 of the output lines 1102, it switches the cell whose first tag datum 1404, second tag datum 1405 or third tag datum 1406 corresponding to its own stage number has value zero (0) and does not switch the cell whose first tag datum 1404, second tag datum 1405 or third tag datum 1406 corresponding to its own stage number has value one (1).

For instance, assume that #0 of the VCCs 1002 attaches a three (3) bit value "101", as combination data of the first tag datum 1404, the second tag datum 1405 and the third tag datum 1406, to a cell supplied from #0 of the input highways 904 to #1 of the input lines 1101 of SRM 1001-1-1 shown in FIG. 10, based on the VPI and VCI in the header 1401 of the cell. In this case, crossing point $C_{10}$ (shown in FIG. 11) of SRM 1001-1-1 in the first stage of the MSSR 901 switches to *1 of the output lines 1102 the cell supplied from #0 of the input lines 1101 of SRM 1001-1-1. Further, crossing point $C_{00}$ of SRM 1001-2-2 in the second stage of the MSSR 901 switches to *0 of the output lines 1102 the cell supplied from #0 of the input lines 1101 of SRM 1001-2-2. Finally, crossing point $C_{11}$ of SRM 1001-3-1 in the third stage of the MSSR 901 switches to #1 of the output lines 1102 the cell supplied from #1 of the input lines 1101 of SRM 1001-3-1. As shown in FIG. 10, *1 of the output lines 1102 of SRM 1001-3-1 is connected to *1 of the output highways 905. Therefore, SRMs 1001-1-1, 1001-2-2 and 1001-3-1 of the MSSR 901 switch in three (3) stages the cell supplied from #0 of the input highways 904 to *1 of the output highways 905.

FIG. 15 shows the tag data combinations in tags attached to test cells in the second preferred embodiment.

When the MSSR 901 shown in FIG. 9 is tested, the TCGs 1206, #0 through #3, respectively in the VCCs 1002, #0 through #3, connected respectively to the input highways 904, #0 through #3, sequentially generate eight (8) kinds of test cells No. 1 through No. 8 having eight ($8=2^3$) combinations of the first tag datum 1404, the second tag datum 1405 and the third tag datum 1406 as shown in FIG. 15. Those test cells are multiplexed on #1 of the input highways 904. At the same time, as shown in FIG. 14, a flag (TCA) 1408 for test cell identification and an input highway number (IHN) 1407 indicating the number of the one of the input highways 904, #0 through #3, supplying the test cell are attached to the tag 1403 of each of the test cells. The header 1401 and the payload 1402 (shown in FIG. 14) of a test cell have void data which are not meaningful.

A test cell inputted from one of the input highways 904, #0 through #3, to the MSSR 901 passes through the SRM set 1001 in three (3) stages to be supplied to one of the output highways 905, *0 through *3. Here, as shown in FIG. 1, each SRM in the SRM set 1001 has two (2) crossing points for one of the input lines 1101, #0 and #1, and two (2) output lines 1102, *0 and *1, selected at a crossing point. Hence, there are eight ($8=2^3$) possible paths for a cell inputted from one of the input highways 904, #0 through #3, to the MSSR 901 to be outputted from one of the output highways 905, *0 through *3. Accordingly, the eight (8) kinds of test cells No. 1 through No. 8 to which tag data combinations shown in FIG. 15 are attached enable all the crossing points in the SRM set 1001 which cells inputted from one of the input highways 904, #0 through #3, pass through to switch the test cells.

The TCCs 906, *0 through *3, (shown in FIG. 9) provided respectively on the output highways 905, *0 through *3, detect eight (8) test cells generated from each of the input highways 904, #0 through #3.

Figure 16:
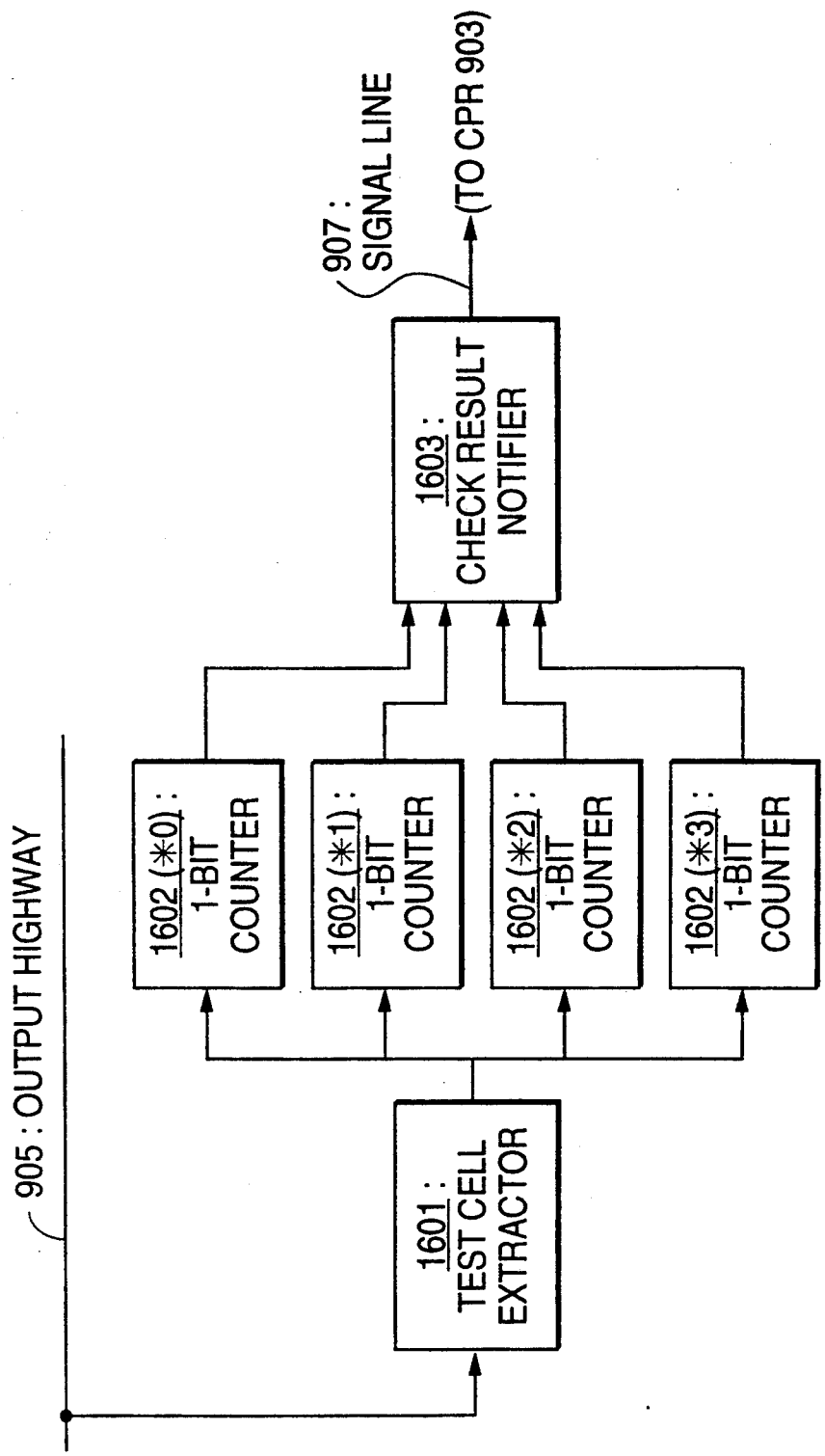
FIG. 16 shows the configuration of a test cell checker in the second preferred embodiment.

FIG. 16 shows the configuration of a test cell checker in the second preferred embodiment.

More specifically, FIG. 16 shows the configuration, which is common to all the TCCs 906, *0 through *3, shown in FIG. 9.

There are two (2) possible paths for a cell inputted from one of the input highways 904, #0 through #3, to be outputted to one of the output highways 905, *0 through *3. For example, a cell inputted from #0 of the input highways 904 to SRM 1001-1-1 (shown in FIG. 10) is outputted from SRM 1001-3-1 to *0 of the output highways 905 via one of the two (2) paths by way of either SRM 1001-2-1 or SRM 1001-2-2. This is the case for other combinations between the input highways 904, #0 through #3, and the output highways 905, *0 through *3. Therefore, as long as all the crossing points in the SRM set 1001 of the MSSR 901 are normal, each of the output highways 905, *0 through *3, must be able to detect two (2) test cells from each of the input highways 904, #0 through #3.

Accordingly, before the TCGs 1206, #0 through #3, respectively in the VCCs 1002, #0 through #3, begin generating test cells, after a reset signal (not shown) from the CPR 903 resets groups (each comprising #0 through #3) of 1-bit counters 1602, *0 through *3, respectively in the TCCs 907, *0 through *3, the CPR 903 instructs the TCGs 1206, #0 through #3, to generate test cells via the CPIF 902.

Thereafter, test cell extractors 1601, *0 through *3, respectively in the TCCs 906, *0 through *3, extract the IHN 1407 and the TCA 1408 from the tag 1403 of each inputted cell. When the TCA 1408 identifies the cell as a test cell, one among #0 through #3 in the groups (each comprising #0 through #3) of 1-bit counters 1602, *0 through *3, corresponding to the number of the one of the input highways 904, #0 through #3, as specified by the IHN 1407, is counted up.

Upon counting up twice, the groups (each comprising #0 through #3) of 1-bit counters 1602, *0 through *3, respectively notify check result notifier 1603, of their counter numbers, which are the ones of #0 through #3. Then, the check result notifier 1603, notify the CPR 903 via the signal line 907, of the fact that the all the crossing points in the SRM set 1001, which switch test cells from the ones (corresponding to the counter numbers, which are the ones of #0 through #3) of the input highways 904, #0 through #3, are normal.

The CPR 903 judges whether or not the MSSR 901 is normal by monitoring whether or not the notifications corresponding to the input highways 904, #0 through #3, are received in a predetermined time period after an instruction is issued for test cell generation.

As described above, the second preferred embodiment enables a channel to be tested just by monitoring whether or not a predetermined number of test cells from the input highways 904, #0 through #3, are detected at the output highways 905, *0 through *3, by attaching to each test cell its IHN 1407 showing which one of the input highways 904, #0 through #3, generates the test cell.

The second embodiment takes up a case in which there are four (4) input highways 904, #0 through #3, and four (4) output highways 905, *0 through *3, and the MSSR 901 comprises the SRM set 1001 having two (2) rows and three (3) stages. However, the above channel configuration is shown only as an example. The second form of this invention is by no means precluded from being applying to other channel configurations. When the numbers of the pertinent elements change, only a few modifications need to be made. That is, TCGs 1206 (provided in correspondence with the number of input highways 904) generate a different number of test cells, which TCCs 907 (provided in correspondence with the number of output highways 905) detect.

A Third Preferred Embodiment

Figure 17:
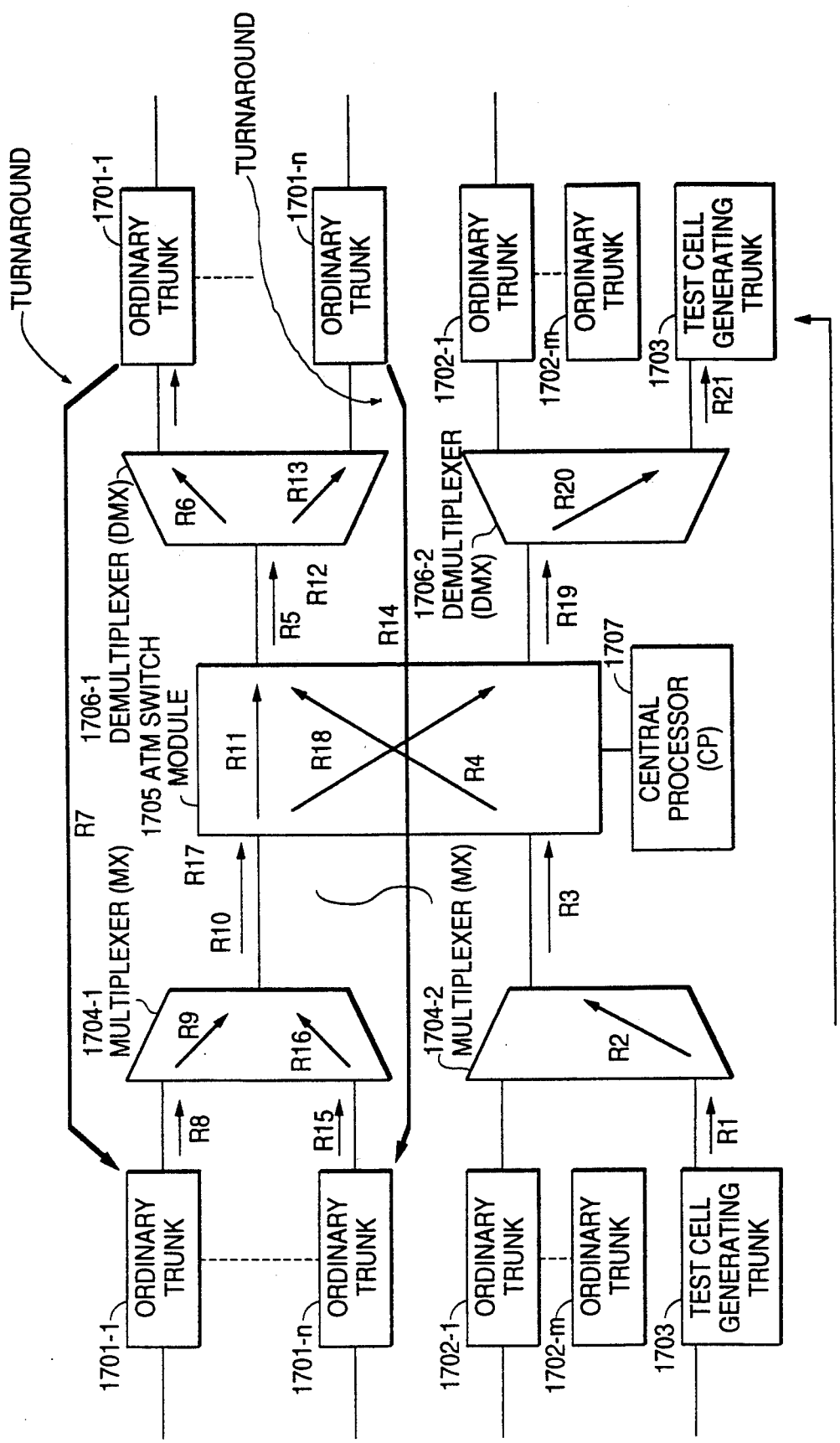
FIG. 17 is a block diagram of a third preferred embodiment of this invention.

FIG. 17 is a block diagram of a third preferred embodiment of this invention.

This configuration of an ATM exchanger corresponds to that shown in FIG. 5, which is a schematic view for explaining a third form of this invention.

In FIG. 17, 1701-1 through 1701-N and 1702-1 through 1702-M are ordinary trunks, 1703 is a test cell generating trunk, 1704-1 and 1704-2 are multiplexers (MXs), 1705 is an ATM switch module, 1706-1 and 1706-2 are demultiplexers (DMXs), and 1707 is a central processor (CP).

Outside of the trunks 1701-1 through 1701-N and 1702-1 through 1702-M, i.e. between other offices or subscribers and this ATM exchanger, signals are transmitted over external transmission paths according to an interoffice protocol such as the SONET (Synchronous Optical Network) protocol. The ordinary trunks 1701-1 through 1701-N and 1702-1 through 1702-M respectively extract an ATM cell from a signal on the transmission paths and send the ATM cells to the ATM switch module 1705 through either multiplexer 1704-1 or 1704-2. The ATM cell switched by the ATM switch module 1705 is sent through DMX 1706-1 to any of ordinary trunks 1701-1 through 1701-N or through DMX 1706-2 to any of ordinary trunks 1702-1 through 1702-M, and the ordinary trunks 1701-1 through 1701-N and 1702-1 through 1702-M in turn send the ATM cell to the external transmission paths.

Internal transmission paths from input trunks to output trunks are set in a plurality according to the size of the ATM switch module 1705. A tag attached at the entrance of either MX 1704-1 or MX 1704-2 selects a particular one of the internal transmission paths.

The test cell generating trunk 1703 generates a test cell with its test cell identification bit set at a predetermined position in the header 1401 turned on, tag data giving an instruction of a predetermined test pattern and tested path stored in its payload 1402, and a tag 1403 showing the first trunk number existing on the tested path attached before the header 1401, upon receiving from the central processor (CP) 1707, as a maintenance command called maintenance signal distributor (MSD), a path testing instruction, trunk numbers of the tested trunks, path numbers of the tested paths in the ATM switch module 1705.

The ATM switch module 1705 switches the test cell according to the tag 1403 attached before the header 1401 and transfers it to a first tested ordinary trunk, e.g. ordinary trunk 1701-1.

The first tested ordinary trunk 1701-1 monitors the header 1401 in respective cells sent from the ATM switch module 1705. Upon detecting a test cell identification bit being on, the tested trunk 1701-1 judges an inputted cell as a test cell and loops back the test cell to a line on the input side of the ATM switch module 1705.

During the loopback, MX 1704-1 extracts a tag 1403 indicating the trunk number of the second trunk existing on the tested path from the tag data stored in the payload 1402 of the test cell and reattaches the tag 1403 before the header 1401 of the test cell. Accordingly, the ATM switch module 1705 switches the test cell looped back by the first tested ordinary trunk 1701-1 according to the reattached tag 1403 and sends it to the second tested ordinary trunk, e.g. 1701-N, on the tested path.

Similarly, the test cell is sequentially transferred to the respective trunks on the tested path and looped back. When the test cell is looped back from the last ordinary trunk on the tested path, either MX 1704-1 or MX 1704-2 extracts a tag 1403 indicating the test cell generating trunk 1703, which is the final end of the tested path from the tag data stored in the payload 1402 of the test cell, and reattaches the tag 1403 before the header 1401 of the test cell.

As a result, the test cell returns in the end to the test cell generating trunk 1703, which judges whether or not the tested path is normal by detecting whether or not the content of the payload 1402 of the test cell before being emitted is the same as that after being returned.

FIG. 17 also shows an exemplary sequence from R1 to R21 as the paths tested by the test cell.

Although FIG. 17 shows, for convenience, the ordinary trunks 1701-1 through 1701-N and 1702-1 through 1702-M, as well as the test cell generating trunk 1703, have separate reception trunks for receiving signals from other offices and emission trunks for emitting signals to other offices, the reception trunks and emission trunks are actually the receiving parts and emitting parts within the same trunks.

Figure 18:
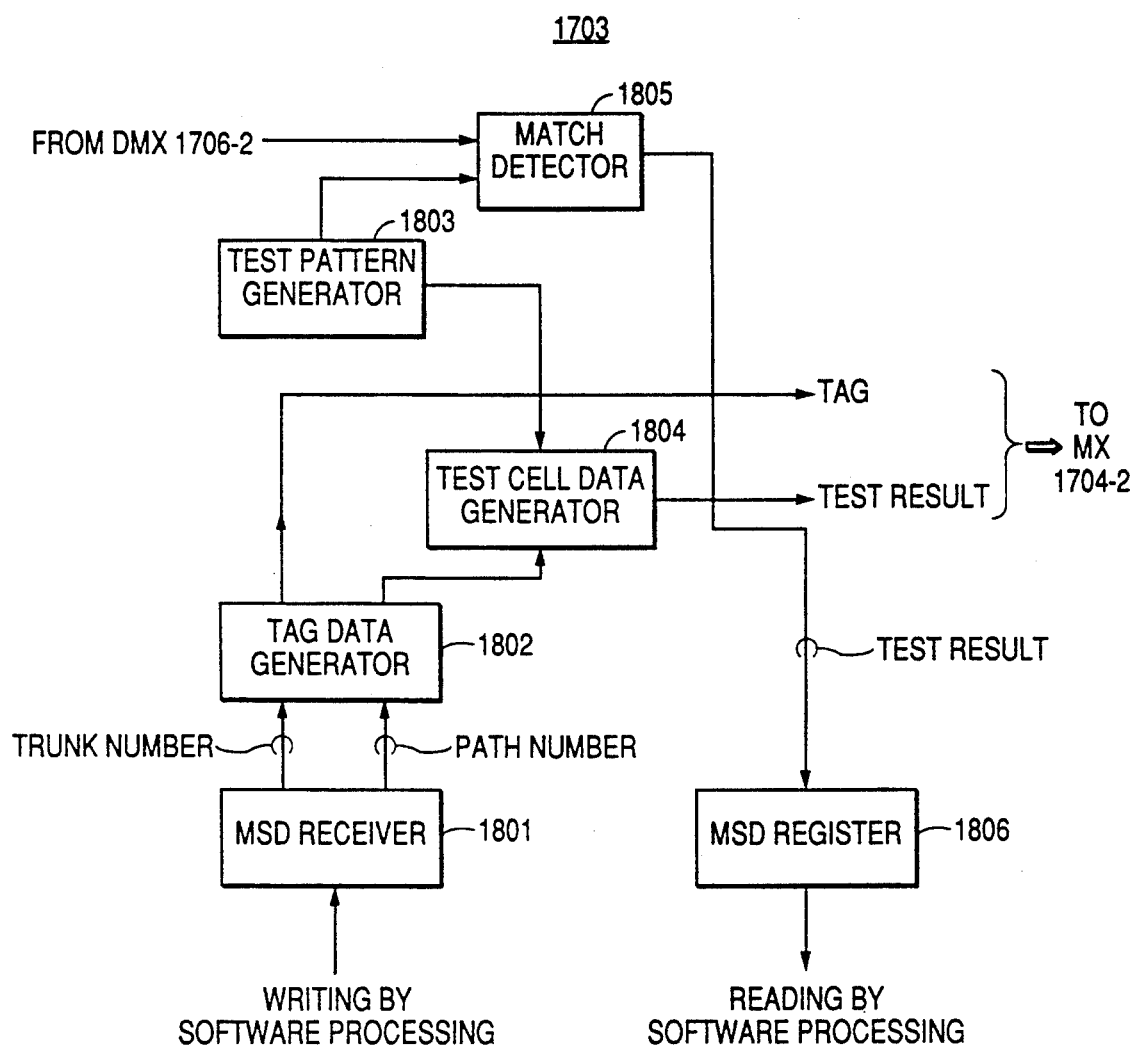
FIG. 18 shows the configuration of a test cell generating trunk in the third preferred embodiment.

FIG. 18 shows the configuration of a test cell generating trunk in the third preferred embodiment. More specifically, FIG. 18 shows the configuration of the test cell generating trunk 1703 shown in FIG. 17.

In FIG. 18, an MSD receiver 1801 receives a maintenance signal distributor (MSD) for path test instruction set in the central processor (CP) 1707, when the ATM switch module 1705 is tested.

A tag data generator 1802 generates tag data, on receipt of the path number of the tested path and the trunk number of the tested trunk on the tested path.

A test pattern generator 1803 generates a predetermined test pattern attached to the payload 1402 of a test cell.

A test cell data generator 1804 generates test cell data attached to the payload 1402 of a test cell, based on the tag data from the tag data generator 1802 and the test pattern from the test pattern generator 1803.

A match detector 1805 detects a match between the test pattern generated by the test pattern generator 1803 and the test pattern stored in the payload 1402 of a test cell from DMX 1706-2 (shown in FIG. 17).

An MSCN (Maintenance Scan) register 1806 stores the comparison result obtained by the match detector 1805.

The test cell generating trunk 1703 having the configuration shown in FIG. 18 is used below for explaining the operations of testing the ATM exchanger shown in FIG. 17, which assumes existence of two (2) tested trunks A (e.g. ordinary trunk 1701-1) and B (e.g. ordinary trunk 1701-N), in addition to the test cell generating trunk 1703, on the tested path.

The MSD receiver 1801 in the test cell generating trunk 1703 receives from the CP 1707 the trunk numbers of the tested trunks A (e.g. ordinary trunk 1701-1) and B (e.g. ordinary trunk 1701-N) and the path number from tested trunk A to tested trunk B in the ATM switch module 1705.

Based on the above information, the tag data generator 1802 generates three (3) tags for routing a test cell over the three (3) tested paths. A first tag routes the test cell from the test cell generating trunk 1703 to tested trunk A. A second tag routes the test cell from tested trunk A to tested trunk B. A third tag routes the test cell from tested trunk B to the test cell generating trunk 1703.

The tag data generator 1802 outputs to MX 1704-2 the first tag to be attached as the tag 1403 before the header 1401 of the test cell. The tag data generator 1802 outputs to the test cell data generator 1804 all other tags (i.e. the second and third tags) to be stored as a part of the payload 1402 of the test cell. The test cell data generator 1804 outputs to MX 1704-2 (shown in FIG. 17) the above tag data together with the test pattern from the test pattern generator 1803 as test cell data.

MX 1704-2 (shown in FIG. 17) generates a test cell having the first tag for routing the test cell from the test cell generating trunk 1703 to tested trunk A attached before the header 1401 with its test cell identification bit set at a predetermined position in the header 1401 turned on and the test cell data from the test cell data generator 1804 stored in its payload 1402. As described above, the test cell data comprise the test pattern, the second tag for routing the test cell from tested trunk A to tested trunk B and the third tag for routing the test cell from tested trunk B to the test cell generating trunk 1703.

The following is a description of the actions when the tested paths are normal.

First, a test cell is sent through MUX 1704-2, the ATM switch module 1705 and DMX 1706-1 to tested trunk A (e.g. ordinary trunk 1701-1), which is one of the two (2) tested trunks A and B.

Tested trunk A returns the received test cell to the ATM switch module 1705 instead of transferring it to a foreign office. At this time, MX 1704-1 extracts from the payload 1402 of the returned test cell the second tag (for routing the test cell from tested trunk A to tested trunk B) and replaces, with the second tag thus extracted, the first tag (for routing the test cell from test cell generating trunk 1703 to tested trunk A) attached before the header 1401 of the test cell returned from tested trunk A (e.g. ordinary trunk 1701-1).

Second, the test cell is sent through MX 1704-1, the ATM switch module 1705 and DMX 1706-1 to tested trunk B (e.g. ordinary trunk 1701-N), which is the other of the two (2) tested trunks A and B.

Tested trunk B returns the received test cell to the ATM switch module 1705 instead of transferring it to a foreign office. At this time, MX 1704-1 extracts from the payload 1402 of the returned test cell the third tag (for routing the test cell from tested trunk B to the test cell generating trunk 1703) and replaces, with the third tag thus extracted, the second tag (for routing the test cell from tested trunk A to tested trunk B) attached before the header 1401 of the test cell returned from tested trunk B (e.g. ordinary trunk 1701-N).

Third, the test cell is sent through MX 1704-1, the ATM switch module 1705 and DMX 1706-1 to the test cell generating trunk 1703, from which the test cell was originally generated.

The match detector 1805 in the test cell generating trunk 1703 compares the test pattern stored in the payload 1402 of the test cell returned after passing through the tested trunks A and B as well as the ATM switch module 1705 with the test pattern generated by the test pattern generator 1803. If they match, the normality of all the tested paths including the ATM switch module 1705 is confirmed. Also, the fact that the test cell is returned in a predetermined time period proves the normality of the tag paths.

The MSCN register 1806 stores the above described test result. The CP 1707 regularly monitors the content of the MSCN register 1806 by its software processing.

Figure 19:
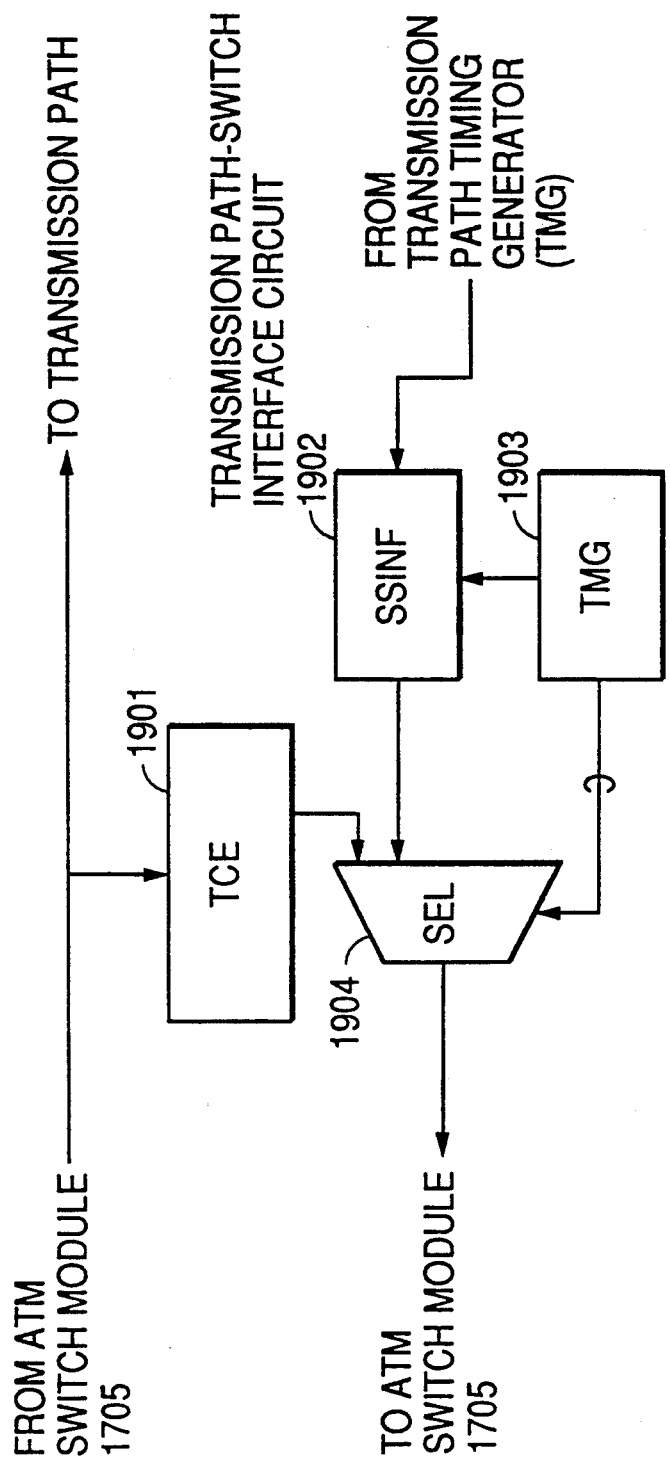
FIG. 19 shows the configuration of the turnaround part of a tested trunk in the third preferred embodiment.

FIG. 19 shows the configuration of the looped back part of a tested trunk in the third preferred embodiment.

More specifically, FIG. 19 shows the configuration, which is common to the respective loopback parts of all the ordinary trunks 1701-1 through 1701-N and 1702-1 through 1702-M shown in FIG. 17.

In FIG. 19, 1901 is a test cell extractor (TCE) for extracting a test cell, 1902 is an interfacer (SSINF) between an external transmission path and a switch for converting frame data format in the SONET format to a data format solely comprising a cell, 1903 is a timing generator (TMG), and 1904 is a selector (SEL) for selectively emitting the output from the TCE 1901 or the output from the SSINF 1902 according to the clock signals from the TMG 1903.

The test cell extractor 1901 monitors whether or not the header 1401 of a cell received from the ATM switch 1705 has a test cell identification bit, extracts the cell when the test cell identification bit is on, and stores the cell in an internally provided buffer (not shown).

Since the SSINF 1902 extracts only the cell part in the frame data of the SONET format transferred from a foreign office or a subscriber over an external transmission path and does not extract the header 1401 such as a section overhead (SOH), a line overhead (LOH) and a path overhead (POH), the input time slots for a SOH, a LOH and a POH remain empty. Therefore, the TMG 1903 detects the empty time slots and causes the SEL 1904 to output to the ATM switch module 1705 the test cell stored in the TCE 1901 during the empty time slots. This enables the paths in an ATM exchanger to be tested even when it switches ordinary cells in addition to a test cell.

Figure 20:
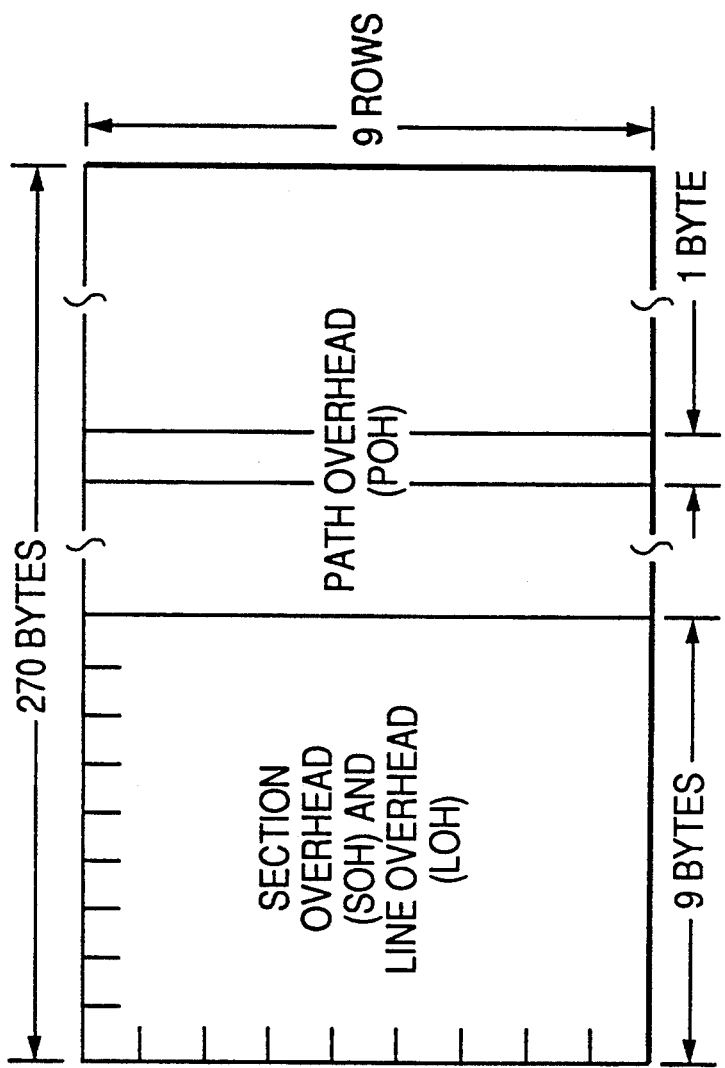
FIG. 20 shows the data format of a transmission path in the third preferred embodiment.

FIG. 20 shows the data format of a transmission path in the third preferred embodiment.

The example shown in FIG. 20 illustrates SONET STS-3c as the data format on the transmission path. In this case, one (1) frame comprises two-hundred seventy (270) bytes by nine (9) rows, of which two-hundred sixty (260) bytes by nine (9) rows, excepting nine (9) bytes by nine (9) rows for a SOH and one (1) byte by nine (9) rows for a LOH, contain cells each having fifty-three (53) bytes to be transmitted. Therefore, it becomes possible to output a test cell to the ATM switch module 1705 during the time slots for inputting the SOH, LOH and POH.

Figure 21:
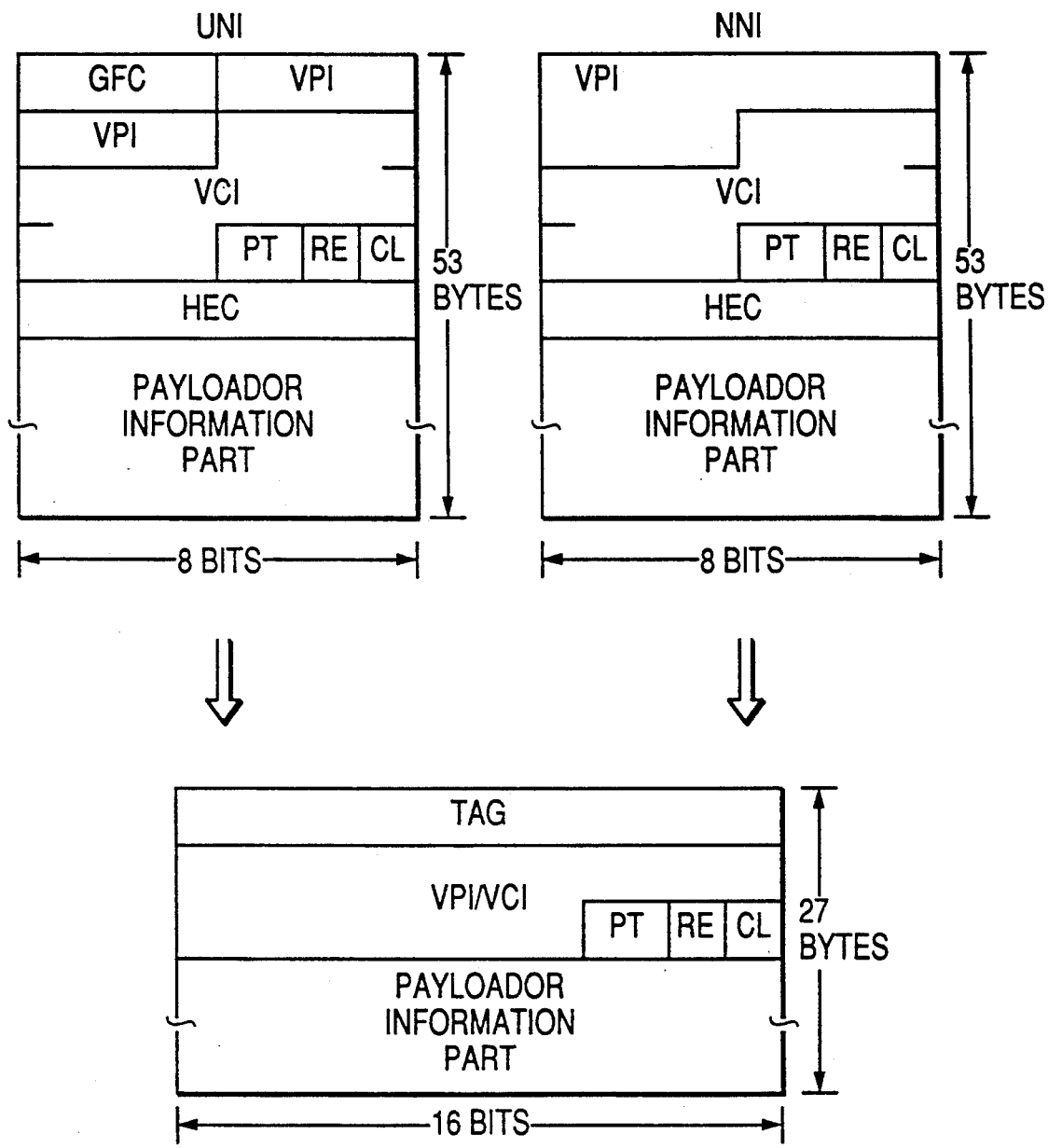
FIG. 21 illustrates the cell format conversion in the third preferred embodiment.

FIG. 21 illustrates the cell format conversion in the third preferred embodiment.

More specifically, FIG. 21 illustrates the cell formats on an external transmission path and in a switching module, which are converted by the SSINF 1902 shown in FIG. 19.

There are UNI (User Node Network) and NNI (Network Node Interface) based cell formats as the data formats for cells having fifty-three (53) bytes. UNI stands for an interface corresponding to an external transmission path connecting a subscriber and an ATM exchanger, and NNI stands for an interface corresponding to an internal transmission path connecting between ATM exchangers.

The header 1401, preceding the payload 1402 for storing payload data, of the UNI based cell format comprises respective data of GFC (Generic Flow Control), VPI (Virtual Path Identifier), VCI (Virtual Channel Identifier), HEC (Header Error Control), PT (Payload Type), RE (Reserve) and CL (Cell Loss Priority).

The header 1401, preceding the payload 1402 for storing payload data, of the NNI based cell format comprises respective data of VPI (Virtual Path Identifier), VCI (Virtual Channel Identifier), HEC (Header Error Control), PT (Payload Type), RE (Reserve) and CL (Cell Loss Priority).

As described earlier, the SSINF 1902 (shown in FIG. 19) extracts only the cell part in frame data of the SONET format, and converts the above described UNI or NNI based cell format to the cell format shown in the lower part of FIG. 21. The header 1401, preceding the payload 1402 for storing payload data, of this cell format comprises respective data of TAG (Tag), VPI (Virtual Path Identifier), VCI (Virtual Channel Identifier), PT (Payload Type), RE (Reserve) and CL (Cell Loss Priority), shedding HEC (Header Error Control) and GFC (Generic Flow Control) if any. As a result, the cell format is converted to a format of twenty-seven (27) bytes by sixteen (16) bits.

In the third preferred embodiment, the ATM switch module 1705 receives both the test cell and ordinary cells from the transmission path in the cell format shown in the lower part of FIG. 21. As described earlier, the header 1401 of the test cell has a test cell identification bit and the payload 1402 of the test cell has a test pattern and tag data for routing the test cell over the tested paths.

Figure 22:
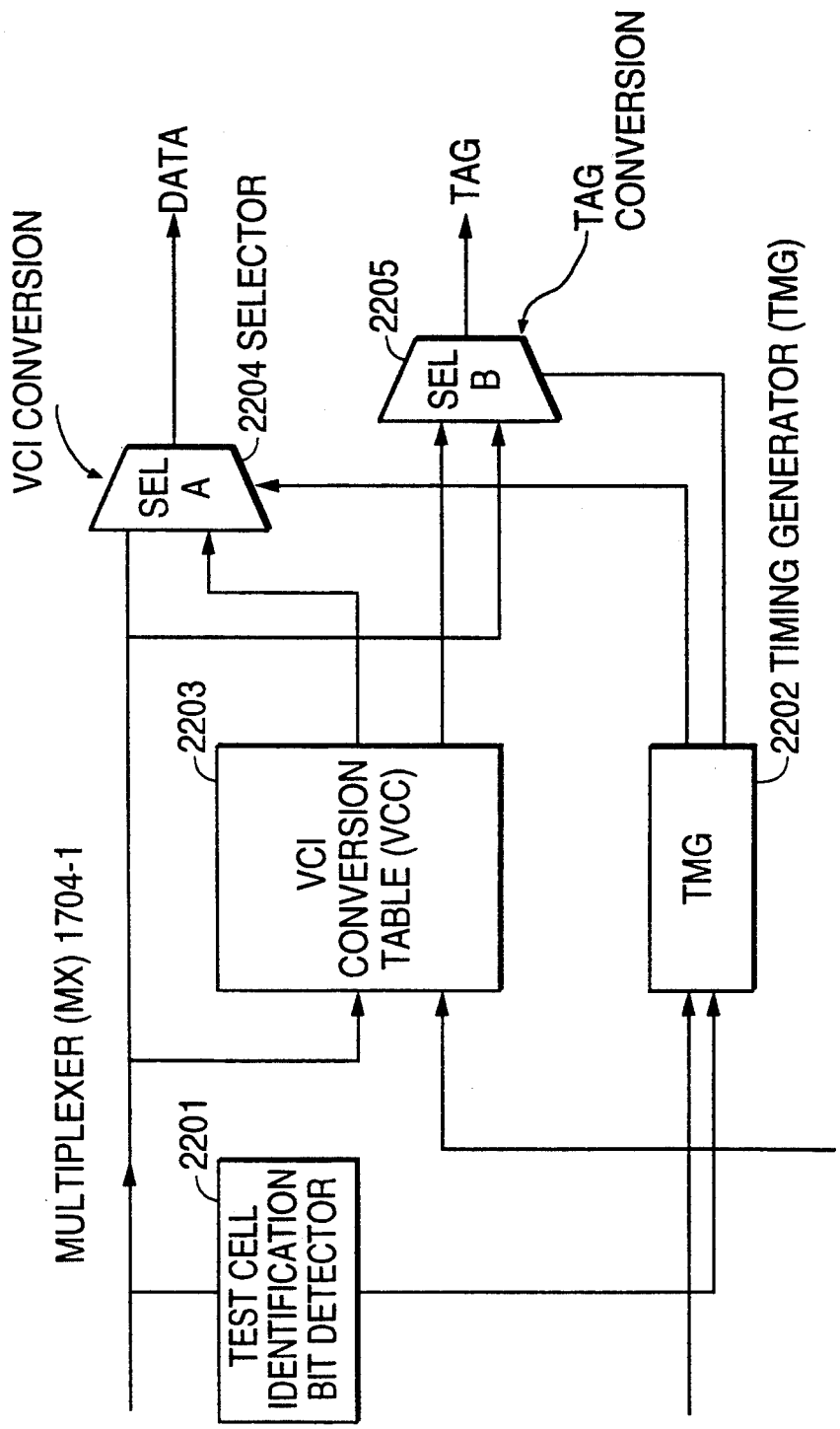
FIG. 22 shows the configuration of the tag operator in a multiplexer in the third preferred embodiment.

FIG. 22 shows the configuration of the tag operator in a multiplexer in the third preferred embodiment.

More specifically, FIG. 22 shows the configuration, which is common to both MX 1704-1 and 1704-2 shown in FIG. 17.

In FIG. 22, 2201 is a test cell identification bit detector, 2202 is a timing generator (TMGs) for generating a selecting signal when the test cell is detected, 2203 is VCC comprising a VCI conversion table, and 2204 and 2205 are selectors (SELs).

The VCC 2203 replaces the VCIs attached to the headers 1401 of all cells from respective subscribers with the new VCIs specifying the next ATM exchanger. The TMG 2202 instructs SEL 2204 to replace tags. The VCC 2203 attaches to the head ends of the cells tags for routing cells over their specified paths in the ATM switch module 1705 (shown in FIG. 17) over which the inputted cells pass through to be outputted to the targeted transmission paths. The TMG 2202 instructs SEL 2205 to attach tags. The VCI conversion table in the VCC 2203 is rewritable by software processing. When a subscriber places a call to another, the CP 1707 (shown in FIG. 17) calculates the tag 1403 and the output VCI corresponding to the input VCI corresponding to the call and sets them in the VCC 2203.

In contrast to the ordinary cells processed as described above, the test cells turned around from one of the ordinary trunks 1701-1 through 1701-N and 1702-1 through 1702-M (shown in FIG. 17) store as tag data in its payload 1402 the tags to be subsequently attached to the test cells themselves, as described earlier. Thus, when the test cell identification bit detectors 2201 respectively in MXs 1704-1 and 1704-2 detects an arrival of the test cell, the TMG 2202 outputs selecting signals to SEL 2204 and 2205. This causes SEL 2204 to output data in the header 1401 of the test cell in lieu of the new VCI replaced by the VCC 2203 SEL 2205 to output as a tag 1403 a part of the tag data stored in the payload 1402 of the test cell in lieu of the tag 1403 attached by the VCC 2203.

Thus, MXs 1704-1 and 1704-2 (shown in FIG. 17) realizes processing for the test cell.

Figure 23:
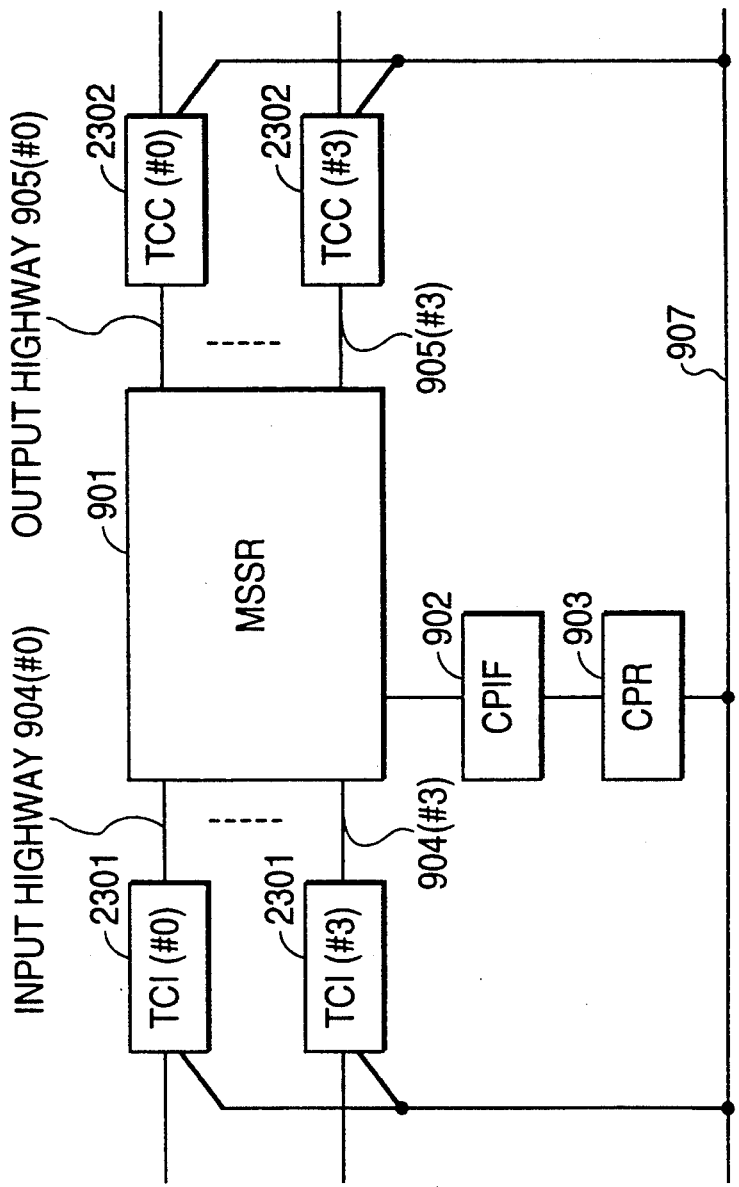
FIG. 23 is a block diagram of a fourth preferred embodiment of this invention.

FIG. 23 is a block diagram of a fourth preferred embodiment of this invention.

This invention of an ATM switching system corresponds to that shown in FIG. 5B, which is a schematic view for explaining a fourth form of this invention.

Parts shown in FIG. 23 which are the same as those shown in FIG. 9 have the same numbers.

That is, as with the second embodiment shown in FIG. 9, a multi-stage self-routing module (MSSR) 901 switches cells inputted from four (4) input highways 904, #0 through #3 and output them to four (4) output highways 905, *0 through *3. Here, the numbers of input highways and output highways need not be limited to four (4). A central processor (CPR) 903 connected through a controller interface (CPIF) 902 controls the MSSR 901.

In addition, test cell inserters (TCI) 2301, #0 through #3, connected respectively to the input highways 904, #0 through #3, insert respectively in the input highways 904, #0 through #3, test cells carrying certain VPIs, VCIs and payloads. This will be described later in detail.

Test cell checkers (TCCs) 2302, *0 through *3, connected respectively to the output highways 905, *0 through *3, detect and monitor test cells from the output highways 905, *0 through *3, when test cells are generated. Their supervision output is notified to the CPR 903 through a signal line 907.

FIG. 10 also shows the configuration of the MSSR 901 shown in FIG. 23 in the fourth preferred embodiment.

Figure 24:
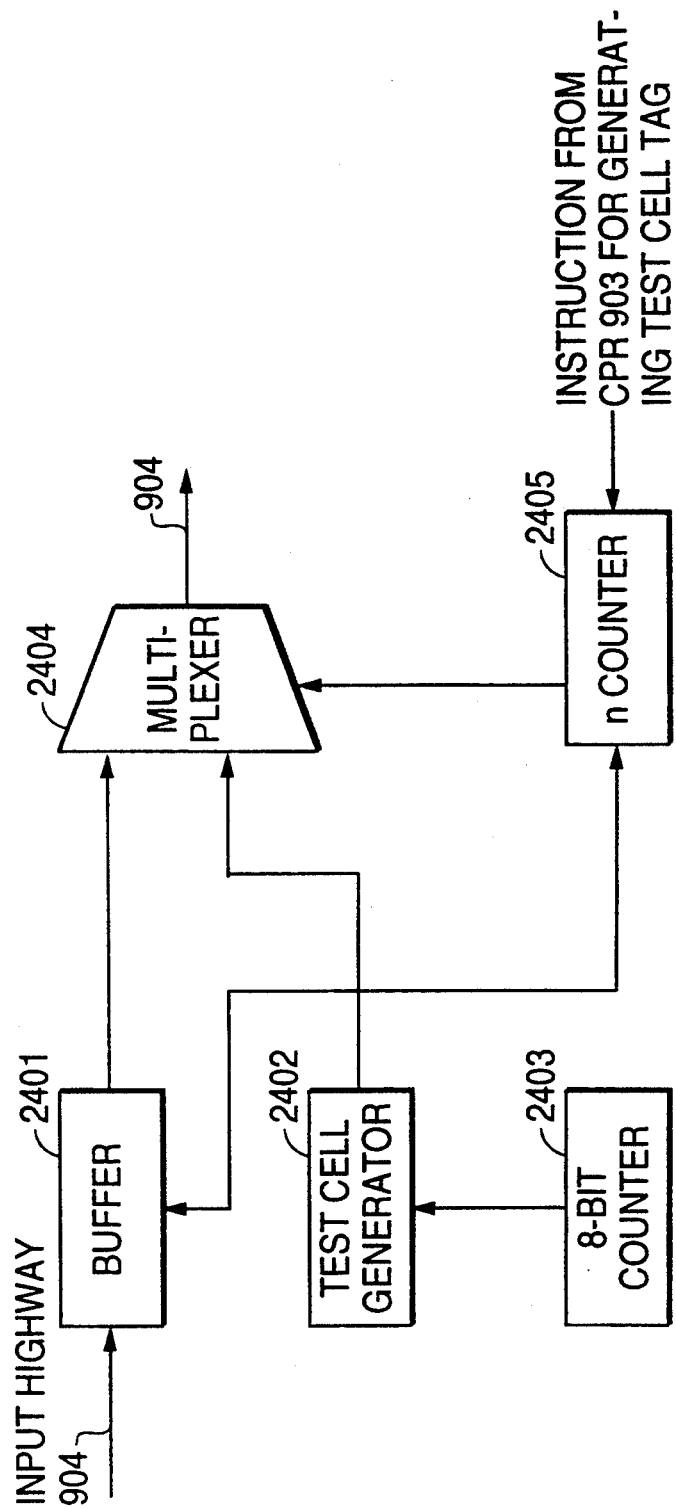
FIG. 24 shows the configuration of a test cell inserter in the fourth preferred embodiment.

FIG. 24 shows the configuration of a test cell inserter in the fourth preferred embodiment.

More specifically, FIG. 24 shows the configuration, which is common to all the TCIs 2301, #0 through #3, shown in FIG. 23.

A test cell is inserted to each of the input highways, #0 through #3, for every n ordinary cells (where n is an appropriate integer) inputted from a subscriber or another ATM exchanger, which are not shown. n is a number large enough not to cause an interference with ordinary cell traffics.

A readout circuit (not shown) reads cells written by the input highways 904, #0 through #3, respectively in buffers 2401, #0 through #3, respectively on their way to multiplexers 2404, #0 through #3, which ordinarily output the cells supplied respectively from the buffers 2401, #0 through #3, "as is" respectively to the input highways 904, #0 through #3, bound for the MSSR 901, which is shown in FIG. 23.

On the other hand, when the CPR 903 shown in FIG. 23 instructs a test cell generation, n counters 2405, #0 through #3, start counting. Each time the n counters 2405, #0 through #3, output a carry after counting n times, the buffers 2403, #0 through #3, respectively stop ordinary cell readouts, and the multiplexers 2404, #0 through #3, respectively output to the input highways 904, #0 through #3, test cells supplied respectively from test cell generators 2402, #0 through #3.

The test cell generators 2402, #0 through #3, respectively generate test cells carrying VPIs, VCIs and payloads based on outputs respectively from 8-bit counters 2403, #0 through #3. The operation of this part is described later in detail.

Figure 25:
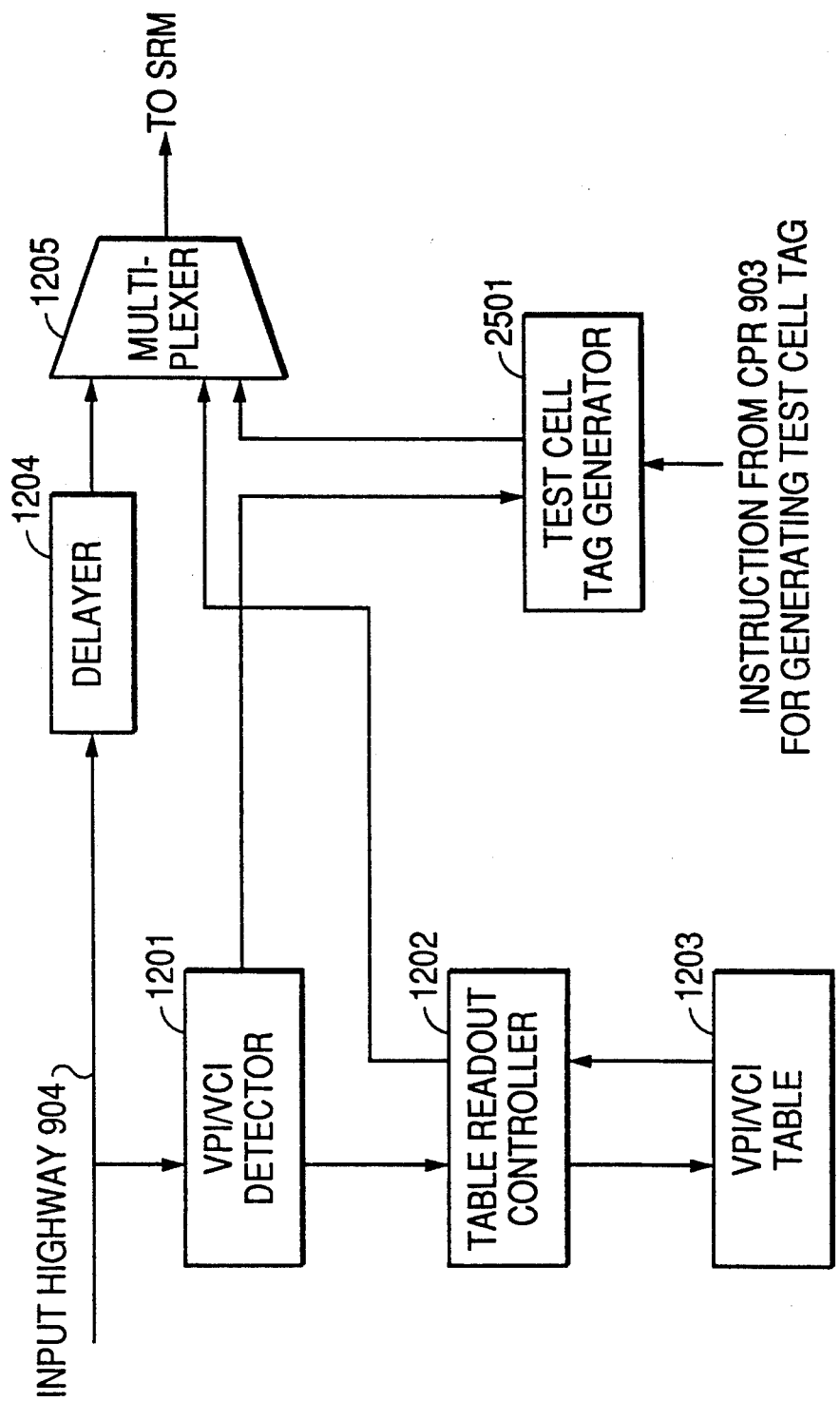
FIG. 25 shows the configuration of a virtual channel converter in the fourth preferred embodiment.

FIG. 25 shows the configuration of a virtual channel converter in the fourth preferred embodiment.

More specifically, FIG. 25 shows the configuration, which is common to all the VCCs 1002, #0 through #3, shown in FIG. 10.

Parts shown in FIG. 25, relating to the fourth embodiment, which are the same as those shown in FIG. 12, relating to the second embodiments, have the same numbers.

VPI/VCI detectors 1201, #0 through #3, detect VPIs and VCIs in the headers of cells supplied respectively from the input highways, #0 through #3.

When the VPI/VCI detectors 1201, #0 through #3, detect VPIs and VCIs of ordinary cells, table readout controllers 1202, #0 through #3, respectfully refer to VPI/VCI tables 1203, #0 through #3, by using the VPI and VCI as addresses, and read the corresponding tag data and the new VPIs and VCIs to be used in the next ATM exchanger.

Multiplexers 1205, #0 through #3, respectively attach to the head ends of cells respectively delayed by delayers 1204, #0 through #3, the tag data read out respectively by the table readout controllers 1202, #0 through #3, and reattach the VPIs and VCIs originally attached to the head ends of the cells to the new ones read out from the table readout controllers 1202, #0 through #3.

The CPR 903 shown in FIG. 23 sets through the CPIF 902 the conversion tables stored in the VPI/VCI tables 1203, #0 through #3, for converting original VPIs and VCIs into tag data and new VPIs and VCIs.

On receiving an instruction for generating a test cell tag from the CPR 903 through the CPIF 902 shown in FIG. 23, test cell tag generators 2501, #0 through #3, generate tag data for test cells, if the VPI/VCI detectors 1201, #0 through #3, respectively determine VPIs and VCIs are of the test cells. The multiplexers 1205, #0 through #3, attach to the head ends of test cells delayed respectively by the delayers 1204, #0 through #3, test cell tag data generated respectively by the test cell tag generators 2501, #0 through #3, and multiplex them over to the empty time slots respectively on the input highways 904, #0 through #3.

The configuration of the MSSR in the fourth preferred embodiment is identical to that in the second preferred embodiment shown in FIG. 10.

The configuration of an SRM in the fourth preferred embodiment is identical to that in the second preferred embodiment shown in FIG. 11.

More specifically, FIG. 11 shows the configuration common to all of the SRMs 1001-1-1 through 1001-3-2 shown in FIG. 10.

Figure 26:
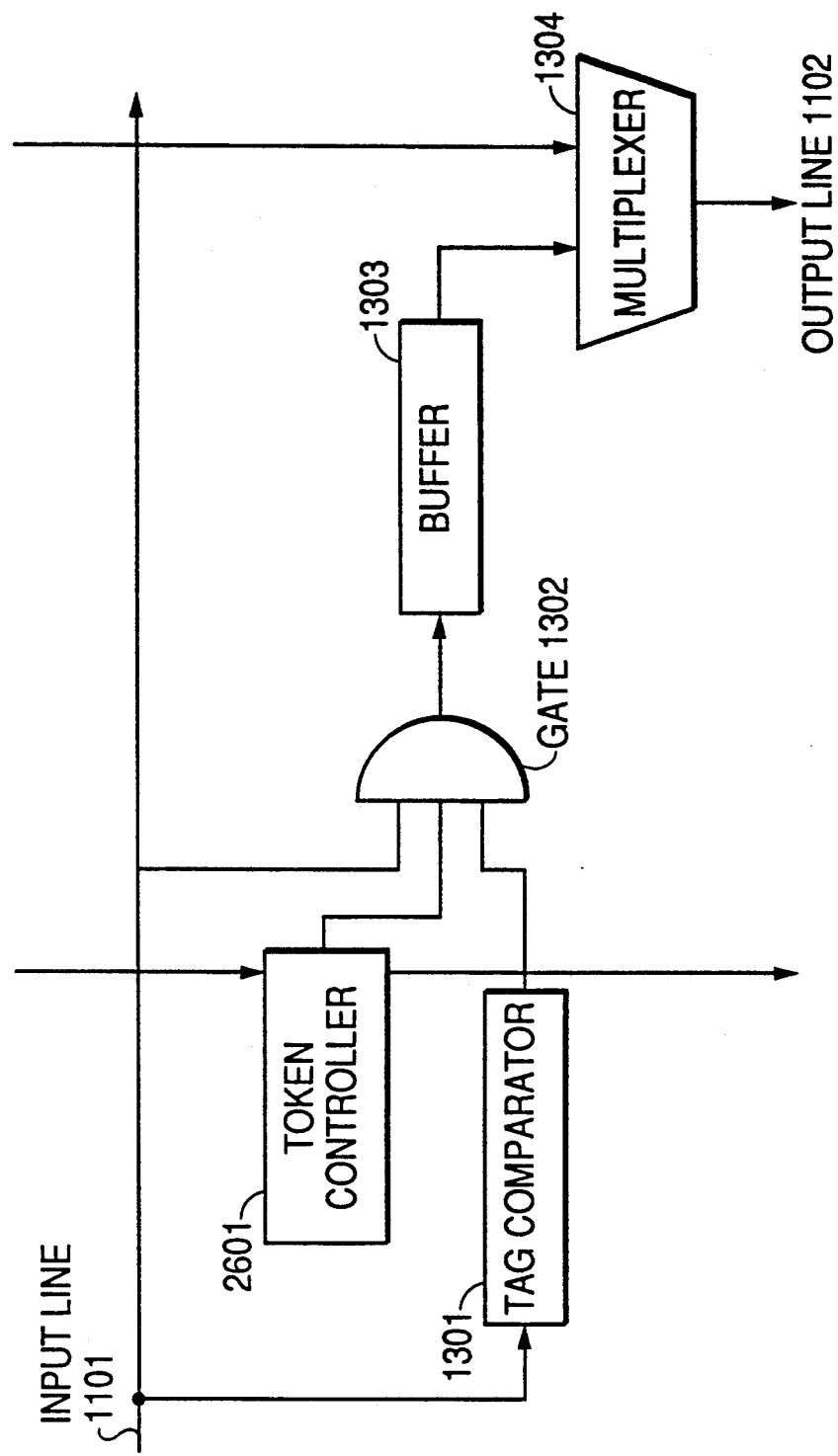
FIG. 26 shows the configuration of a crossing point in the fourth preferred embodiment.

FIG. 26 shows the configuration of a crossing point in the fourth preferred embodiment.

Parts shown in FIG. 26, relating to the fourth embodiment, which are the same as those shown in FIG. 13, relating to the second embodiment, have the same numbers.

That is, a tag comparator 1301 detects the tags attached to the head ends of the cells supplied from #0 or #1 of the input lines 1101, (Refer to FIG. 11.) and judges whether or not to switch the cells at its own crossing point. Here, when it is judged to switch the cells at its own crossing point, a gate 1302 is turned on by an active output from a token controller 2601 to be described later, and a buffer 1303 receives the cells inputted successively to the tag data from #0 or #1 of the input lines 1101. Then, a multiplexer 1304 multiplexes the cells stored in the buffer 1303 on the free time slots of *0 or *1 of the output lines 1102. (Refer to FIG. 11.) Among the tags attached to the head ends of the cells, only those used for the judgments are deleted before the cells are multiplexed on the free time slots of *0 or *1 of the output lines 1102.

Because a pair of crossing points $C_{00}$ and $C_{01}$ (or $C_{10}$ and $C_{11}$) share *0 (or *1) of the output lines 1102, there are cases in which their output operations interfere with each other. To overcome this problem, a flag datum called a token is circulated sequentially between the crossing points in a same pair sharing the same one of the output lines 1102. Each of the token controllers 2601 provided at the corresponding one of the crossing points $C_{00}$, $C_{01}$, $C_{10}$ and $C_{11}$ activates its crossing point for a cell output, only when it holds the token. This prevents the cell output interference between the crossing points sharing the same the output lines 1102.

Figure 27:
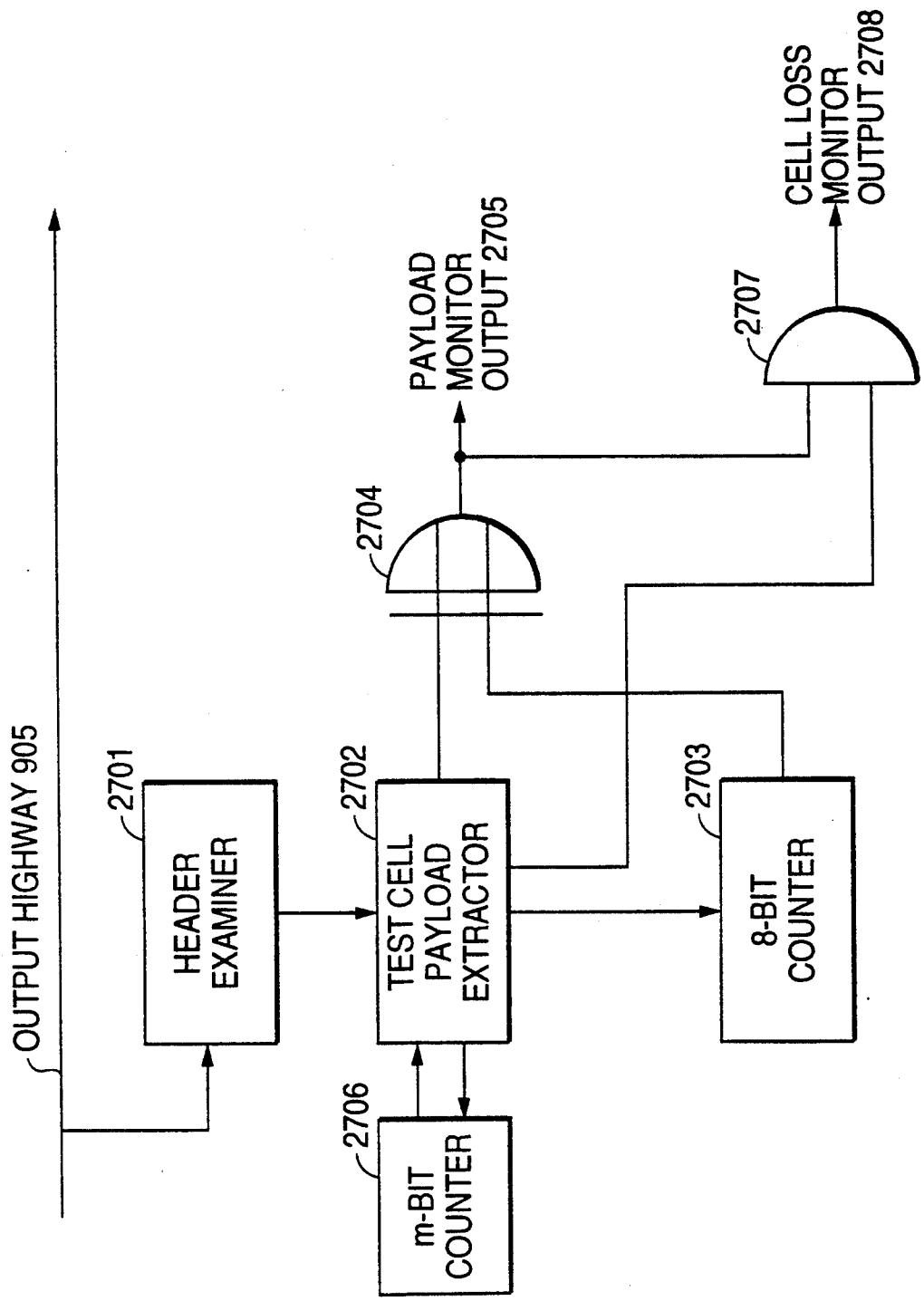
FIG. 27 shows a first configuration of a test cell checker in the fourth preferred embodiment.

FIG. 27 shows a first configuration of a test cell checker in the fourth preferred embodiment.

More specifically, FIG. 27 shows a first configuration, which is common to all the TCCs 2302, *0 through *3, shown in FIG. 23.

Header examiners 2701, *0 through *3, respectively examine the VPIs and VCIs in the headers 1401 of the cells transferred respectively on the output highways 905, *0 through *3, for distinguishing test cells from ordinary cells. (Refer to FIG. 23.) The header examiners 2701, *0 through *3, output payloads (to be described later) inputted in the headers 1401 respectively to test cell payload extractors 2702, *0 through *3, upon confirming a pass-through of a test cell.

The test cell payload extractors 2702, *0 through *3, pass the payload values of the head end octets in the payloads of the head end cells, of the payloads of the successively inputted $2^m$ cells (where m is an integer), respectively over to 8-bit counters 2703, *0 through *3, as their initial counter values. Then, the test cell payload extractors 2702, *0 through *3, sequentially output payload values of respective octets in the payloads of the test cells respectively to exclusive OR circuits 2704, *0 through *3.

To realize the above operations, the test cell payload extractors 2702, *0 through *3, respectively count up by plus one (+1) test cell m-bit counters 2706, *0 through *3, on each receipt of the payload values of the head end octets in the payloads of respective test cells. At this time, the m-bit counters 2706, *0 through *3, starts their count-up operations from an initial value zero (0). On completing $2^m$ times of count-up operations, their counter values revert to zero (0). Therefore, the test cell payload extractors 2702, *0 through *3, recognize the timings at which the head end cells, of the successively inputted $2^m$ cells, are inputted, as the timings of the output values of the m-bit counters 2706, *0 through *3, becoming zero (0).

That is, the test cell payload extractors 2702, *0 through *3, judges whether or not the output values of the m-bit counters 2706, *0 through *3, are zero (0), before executing the above count-up operations. They supply the payload values of the head end octets in the payloads of inputted cells respectively to the 8-bit counters 2703, *0 through *3, as their initial counter values, only when the output values are zero (0).

Also, the test cell payload extractors 2702, *0 through *3, output signals activated by each input of the payload values of the head end octets in the payloads of respective test cells respectively to AND circuits 2707, *0 through *3.

Then, the 8-bit counters 2703, *0 through *3, perform their count-up operations sequentially from the above initial counter values, and output the counter values respectively to the exclusive OR circuits 2704, *0 through *3.

The exclusive OR circuit 2704, *0 through *3, respectively supply, to the CPR 903 through the signal line 907 shown in FIG. 23, payload monitor outputs 2705, *0 through *3, which become active when the outputs from the test cell payload extractors 2702, *0 through *3, respectively mismatch the outputs from the 8-bit counters 2703, *0 through *3.

Further, AND circuits 2707, *0 through *3, respectively supply, also to the CPR 903 through the signal line 907 shown in FIG. 23, cell loss monitor outputs 2708, *0 through *3, which become active respectively when the payload monitor outputs 2705, *0 through *3, and the signals supplied from the test cell payload extractors 2702 to the AND circuits 2707, *0 through *3, are both active. That is, the AND circuits 2707, *0 through *3, respectively activate the cell loss monitor outputs 2708, *0 through *3, respectively when the payload monitor outputs 2705, *0 through *3, are active at the timings when the test cell payload extractors 2702, *0 through *3, respectively receive the payload values of the head end octets in the payloads of respective test cells.

Figure 28:
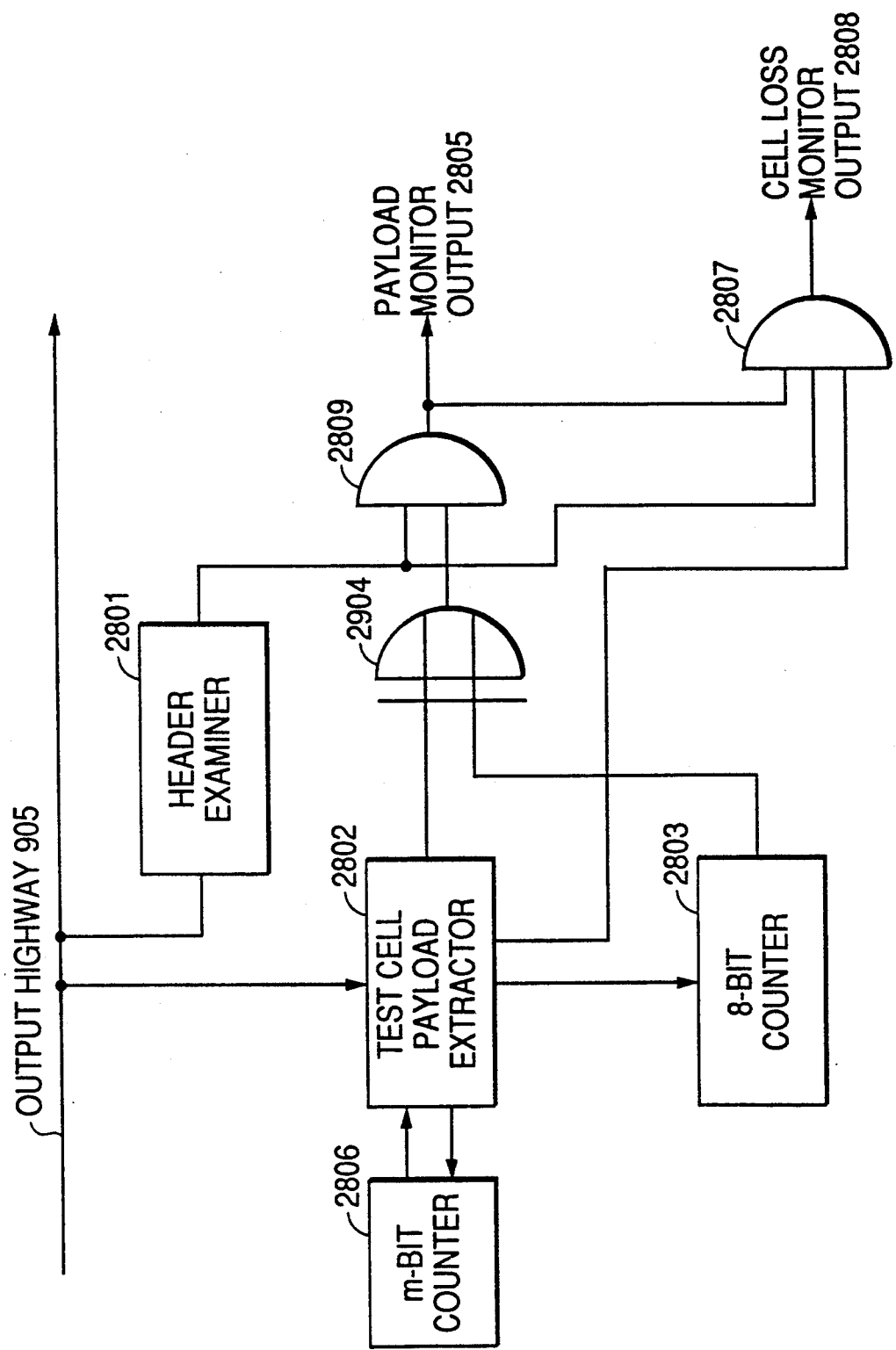
FIG. 28 shows a second configuration of a test cell checker in the fourth preferred embodiment.

FIG. 28 shows a second configuration of a test cell checker in the fourth preferred embodiment.

More specifically, FIG. 28 shows a second configuration, which is common to all the TCCs 2302, *0 through *3, shown in FIG. 23.

The parts shown in FIG. 28 have the same last two-digit numbers as those shown in FIG. 27.

For example, header examiners 2801, *0 through *3, shown in FIG. 28 correspond respectively to the header examiners 2701, *0 through *3, shown in FIG. 27. At the timings when the header examiners 2801, *0 through *3, detect the VPIs and VCIs of the test cells, AND circuits 2807 and 2809, *0 through *3, both turn on respectively, and both payload monitor outputs 2805 and cell loss monitor outputs 2808, *0 through *3, become effective.

Figure 29:
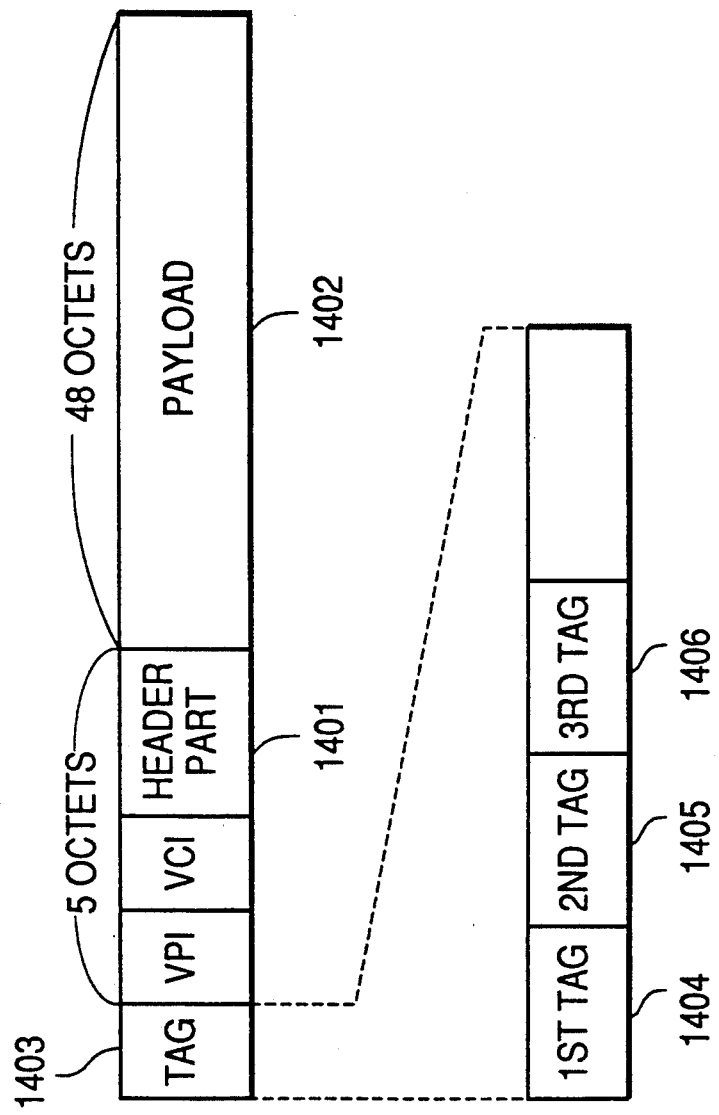
FIG. 29 shows the configuration of an ATM cell in the fourth preferred embodiment.

FIG. 29 shows the configuration of an ATM cell in the fourth preferred embodiment.

Parts shown in FIG. 29 which are the same as those shown in FIG. 14 have the same numbers.

As in FIG. 14, which shows the configuration of an ATM cell in the second preferred embodiment, in FIG. 29, cells supplied from the input highways 904, #0 through #3, shown in FIG. 23, comprises a header 1401 having a data length of five (5) octets for carrying address data and a payload 1402 having a data length of forty-eight (48) octets for carrying payload data for actual communications from the originator to the receiver. The header 1401 stores a VPI, indicating the information designating the cell path in the current ATM exchanger, and a VCI, indicating the cell destination, in addition to other pertinent information e.g. on a payload type and a cell loss priority in case of discarding cells, as well as a CRC code for error correction, as described earlier.

Each of the VCCs 1002, #0 through #3, of the fourth preferred embodiment shown in FIGS. 10 and 25 attaches at the head end of a cell, i.e. before the header 1401 a tag 1403 having a data length e.g. of two (2) octets. The tag 1403 comprises a first tag datum 1404, a second tag datum 1405 and a third tag datum 1406 each with one (1) bit, in the fourth preferred embodiment. An actual ATM exchanger may assign a larger number of bits to each subdivisions of a tag 1403. The first tag datum 1404, the second tag datum 1405 and the third tag datum 1406 for the fourth preferred embodiment shown in FIG. 29 function pari passu those for the second preferred embodiment shown in FIG. 14. However, the tag 1403 shown in FIG. 29 does not carry an input highway number (IHN), unlike the tag 1403 shown in FIG. 14.

Figure 30:
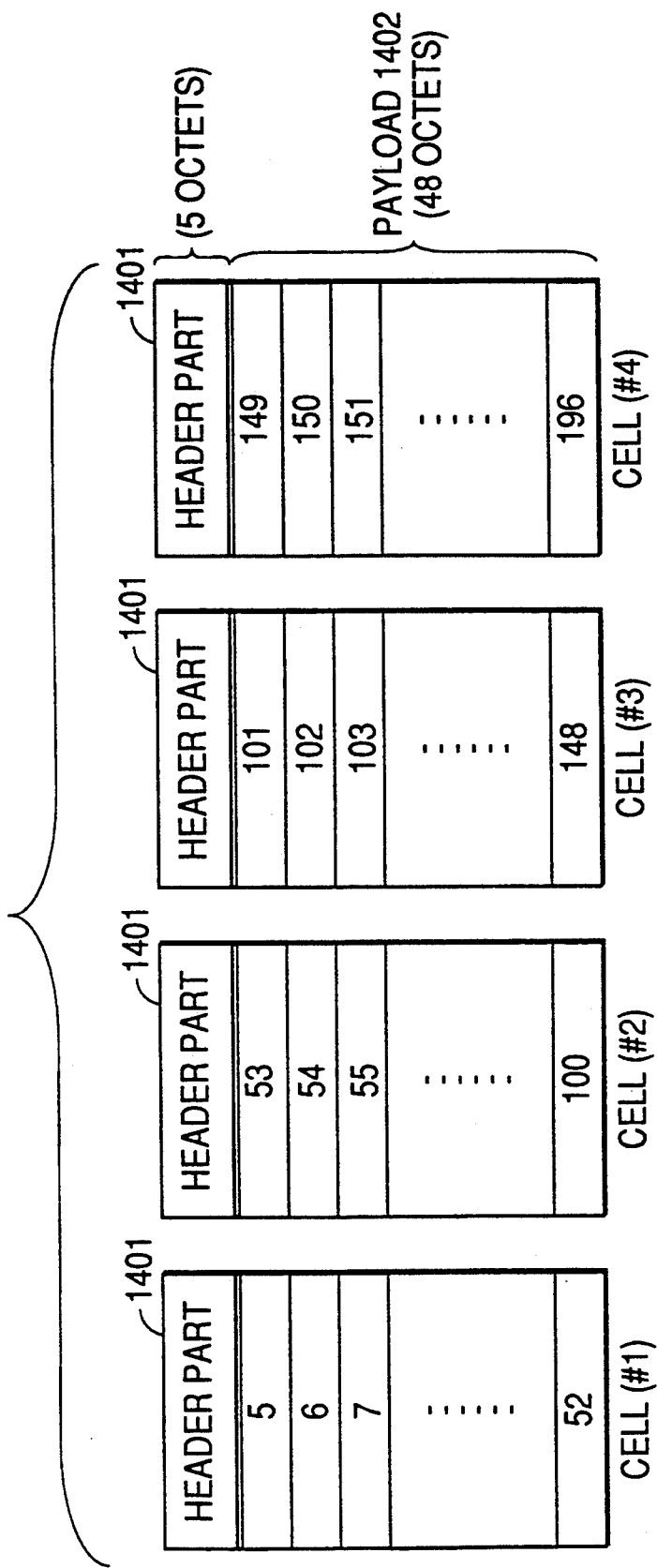
FIG. 30 shows examples of test data attached to respective octets of the payload of a test cell.

FIG. 30 shows examples of test data attached to respective octets of the payload of a test cell.

The test operations of the MSSR 901 (ATM switch) shown in FIG. 23 most relevant to this invention are explained next.

For invoking a test operation, the CPR 903 shown in FIG. 23 via the signal line 907 outputs to the TCIs 2301, #0 through #3, instructions for generating test cells. The CPR 903 via the CPIF 902 outputs to the VCCs 1002, #0 through #3, in the MSSR 901 an instruction for generating test cell tags.

When the TCIs 2301, #0 through #3 accept the instruction for generating test cells, the n-counters 2405, #0 through #3, shown in FIG. 24 starts their counting operations. As described earlier, each time the n-counters 2405, #0 through #3, output a carry after counting n times, ordinary cell readouts from the buffers 2401, #0 through #3, are inhibited respectively, and the multiplexers 2404, #0 through #3, release test cells outputted respectively from the test cell generators 2402, #0 through #3, respectively to the input highways 904, #0 through #3.

FIG. 30 is explained by referring to the header 1401 and payload 1402 shown in FIG. 29.

The test cell generators 2402, #0 through #3, attach to the header 1401 of each of the generated test cells a VPI and a VCI for a test cell. Also, the test cell generators 2402, #0 through #3, store in respective ones of the forty-eight (48) octets of the payload 1402 of the test cell, output values respectively from the 8-bit counters 2403, #0 through #3. Therefore, the payload 1402 of each of the test cells stores sequentially incrementing test data values in its respective ones of forty-eight (48) octets starting from the one at the head end. The 8-bit counters 2403, #0 through #3, are not necessarily reset, and therefore, the payload 1402 of each of the test cells may set test data values sequentially incrementing from an appropriate value.

In an example shown in FIG. 30, a test cell No. 1 stores output values five (5) through fifty-two (52) in respective one of the forty-eight (48) octets of its payload 1402, a test cell No. 2 stores output values fifty-three (53) through one hundred (100) in respective one of the forty-eight (48) octets of its payload 1402, a test cell No. 3 stores output values one hundred one (101) through one hundred forty-eight (148) in respective one of the forty-eight (48) octets of its payload 1402, and a test cell No. 4 stores output values one hundred forty-nine (149) through one hundred ninety-six (196) in respective one of the forty-eight (48) octets of its payload 1402.

In this manner, the MSSR 901 shown in FIG. 23 receives the test cells outputted to input highways 904, #0 through #3, respectively via VCCs 1002, #0 through #3. (Refer to FIG. 10.)

The test cell tag generators 2501, #0 through #3, shown in FIG. 25 respectively in the VCCs 1002, #0 through #3, receive the instruction for generating test cell tags.

Thereafter, the test cell tag generators 2501, #0 through #3, sequentially generates test cell tag data, respectively when the VPI/VCI detectors 1201, #0 through #3, detect the VPIs and the VCIs of the test cells. The multiplexers 1205, #0 through #3, attach the test cell tag data generated respectively by the test cell tag generators 2501, #0 through #3, to the head ends of test cells delayed respectively by the delayers 1204, #0 through #3, and multiplex them over to the free time slots respectively on the input highways 904, #0 through #3.

In this case, the test cell tag generators 2501, #0 through #3, generate eight (8) kinds of test cell tags as defined in FIG. 15 by the $2^3$ combinations of the first tag 1404, the second tag 1405 and the third tag 1406. Each of the test cell tag generators 2501, #0 through #3, generates $2^m$ test cell tags for each of a first kind of test cells through an eighth kind of test cells. The multiplexers 1205, #0 through #3, attach the test cell tags inputted respectively from the test cell tag generators 2501, #0 through #3. When m=2, for instance, the test cell tag generators 2501, #0 through #3, respectively generate four (4) test cell tags of the first kind, which the multiplexers 1205, #0 through #3, respectively attach to a first group of the sequentially inputted four (4) test cells. Then, the test cell tag generators 2501, #0 through #3, respectively generate four (4) test cell tags of the second kind, which the multiplexers 1205, #0 through #3, respectively attach to a second group of the sequentially inputted four (4) test cells. Those procedures are repeatedly executed for test cell tags of the third kind through those of the eighth kinds.

In the fourth preferred embodiment as well, a cell inputted from any of the input highways 904, #0 through #3, passes through the three (3) stages of self-routing modules, i.e. either SRM 1001-1-1 or SRM 1001-1-2 in the first stage, either SRM 1001-2-1 or SRM 1001-2-2 in the second stage, and either SRM 1001-3-1 or SRM 1001-3-2 in the third stage, of the MSSR 901 to any of the output highways 905, *0 through *3, as shown in FIG. 10. And in the fourth preferred embodiment as well, each of the SRMs 1001-1-1 through 1001-3-2 has two (2) crossing points for each of its two (2) input lines 1101, #0 and #1, for enabling either of its two (2) output lines 1102, *0 and *1, to be selected, as shown in FIG. 11. Therefore, there are eight $(8(=2^3))$ possible paths in the MSSR 901 for a cell inputted from any of the input highways 904, #0 through #3 and outputted to any of the output highways 905, *0 through *3.

Thus, a group of test cells together having eight (8) kinds of tag data combinations as defined in FIG. 15 are necessary for testing the switching operations of all the crossing points in the SRMs 1001-1-1 through 1001-3-2 of the MSSR 901 the group of test cells may pass through, after being inputted from any of the input highways 904, #0 through #3, and before being outputted from any of the output highways 905, *0 through *3. This principle remains the same, no matter how large the MSSR 901 shown in FIG. 23 increases its size.

Accordingly, each of the input highways 904, #0 through #3, outputs $2^m \times 8$ test cells all together to the MSSR 901 for testing the SRM switching operations. TCCs 2302, *0 through *3, (shown in FIGS. 27 and 28) provided respectively on the output highways 905, *0 through *3, (shown in FIG. 23) together detect $2^m \times 8$ test cells inputted from each of the input highways 904, #0 through #3. Cells having the same tag are outputted to the same one of the output highways 905, *0 through *3, via the same path in the MSSR 906. Hence, as long as the MSSR 901 functions normally, each one of the TCCs 2302, *0 through *3, provided respectively on the output highways 905, *0 through *3, must detect $2^m$ test cells having the same tag generated successively by one [1] of the input highways 905, #0 through #3 and passing through the same path in the MSSR 901.

Thus, the header examiners 2701, *0 through *3, (shown in FIG. 27) respectively in the TCCs 2302, *0 through *3, examine the VPI and VCI in the header 1401 (shown in FIG. 29) of a cell transferred respectively on the output highways 905, *0 through *3. On confirming a test cell pass-through, the header examiners 2701, *0 through *3, output the payload 1402 inputted succeedingly to the header 1401 respectively to the test cell payload extractors 2702, *0 through *3. (Refer to FIGS. 29 and 30.)

The test cell payload extractors 2702, *0 through *3, respectively output the payload values of the head end octets in the payload of the head end cells, of respective payloads of $2^m$ cells inputted successively, respectively as the initial counter values of the 8-bit counters 2703, *0 through *3. The input timings of the head end cells can be detected as the timings at which the output values of the m-bit counters 2706, *0 through *3, become zero (0).

The 8-bit counters 2703, *0 through *3, count up their respective counter values from the initial counter values, upon each input timing of respective octets.

Thereafter, the test cell payload extractors 2702, *0 through *3, sequentially output the payload values of respective octets of each payload 1402 of each of the successively inputted $2^m$ (where m is an integer) cells respectively to the exclusive OR circuits 2704, *0 through *3. The 8-bit counters 2703, *0 through *3, sequentially output their counter values respectively to the exclusive OR circuits 2704, *0 through *3. Meanwhile, the 8-bit counters 2703, *0 through *3, output their counter values respectively to the exclusive OR circuits 2704, *0 through *3.

The TCIs 2301, #0 through #3 shown in FIG. 23, whose common configuration is shown in FIG. 24, store, in respective octets of the payload 1402 of a test cell, sequentially incrementing test data values from the head end octet, as shown in FIG. 30. Consequently, as long as respective crossing points (Refer to FIG. 11.) in each of the SRMs 1001-1-1 through 1001-3-2 perform normal switching operations, the exclusive OR circuits 2704, *0 through *3, must always receive the same input values respectively from the test cell payload extractors 2702, *0 through *3, as those respectively from the 8-bit counters 2703, *0 through *3. As such, if the both input values mismatch respectively, the payload monitor outputs 2705, *0 through *3, respectively from the exclusive OR gates, *0 through *3, get active. This allows the normality of each crossing point to be diagnosed. The CPR 903 receives via the signal line 907 shown in FIG. 23 the payload monitor outputs 2705, *0 through *3.

As described earlier, the test cell tag generators 2501, #0 through #3, respectively in the VCCs 1002, #0 through #3, (shown in FIG. 10) respectively on the input highways 904, #0 through #3, of the MSSR 901 (shown in FIG. 23) attach the same kind of tag data combinations to the $2^m$ test cells successively inputted respectively from the TCIs 2301, #0 through #3, shown in FIG. 23. Accordingly, the test data values stored in respective payloads of the $2^m$ cells successively inputted respectively to the TCCs 2302, *0 through *3, provided respectively on the output highways 905, *0 through *3, corresponding to the above eight (8) kinds of tag data combinations are of the consecutive values. For instance, in FIG. 30 showing the example in which m=2, the four (4) test cells, No.1 through No.4, as a whole, take on the test data having consecutive values five (5) through one hundred ninety-six (196).

As a result, in case of a test cell loss in the MSSR 901, the test cell payload extractors 2702, *0 through *3, shown in FIG. 27, respectively in the TCCs 2302, *0 through *3, the payload values of the head end octets in the payloads of the test cells succeeding the discarded test cell mismatch the outputs respectively from the 8-bit counters 2703, *0 through *3, at the timings when the test cell payload extractors 2702, *0 through *3, shown in FIG. 27 receive the payload values. Hence, at these timings, the payload monitor outputs 2705, *0 through *3, respectively become active, the AND circuits 2707, *0 through *3 respectively turn on, and the cell loss monitor outputs 2708, *0 through *3, respectively become active, which alert a cell loss occurrence in the MSSR 901. The cell loss monitor outputs 2708, *0 through *3, are notified to the CPR 903 through the signal line 907 shown in FIG. 23.

Although the fourth preferred embodiment discusses a case in which there are four (4) input highways 904, #0 through #3, and four (4) output highways 905, *0 through *3, and the MSSR 901 comprises the SRMs 1001-1-1 through 1001-3-2 arrayed in a 2×3 configuration having two (2) rows and three (3) stages, this invention should by no means be construed to afford an application limited to such a configuration. But instead, it can be quite easily modified for other configurations, even if those numbers do change e.g. by altering the numbers of test cells generated by respective input highways.

Also, the fourth preferred embodiment discusses a case in which test cells are inserted on the empty time slots for diagnosing switches while actually performing the ATM switching operation without causing any operational interference. Usually, an ordinary ATM exchanger has a redundant arrangement for increased reliability. For instance, it has a dual system structure having the entire configuration shown in FIG. 23 duplicated, such that one is used as an act system, while the other is used as a backup system. Therefore, if the backup system is diagnosed as prescribed in the fourth preferred embodiment, the backup system is diagnosed without any interference with the current switching operations in progress. On finishing the test on the backup system, a similar diagnosis is performed by exchanging the act system with the backup system.

Finally, FIG. 23 shows a configuration in which the input highways 904, #0 through #3, respectively have their own proprietary TCIs 2301, #0 through #3, and the output highways 905, *0 through *3, respectively have their own proprietary TCCs 2302, *0 through *3. However, an alternative configuration is also possible, such that one (1) TCI 2301 is sequentially reconnected to input highways 904, #0 through #3, and one (1) TCC 2302 is sequentially reconnected to the output highways 905, *0 through *3. The multiplexers 1204, #0 through #3, may perform such reconnections, for example.

What is claimed is:

1. An asynchronous transfer mode channel testing apparatus for testing an asynchronous transfer mode channel, the asynchronous transfer mode channel having switches therein to direct traffic, comprising:

test cell generating trunk means, provided on an input side of said asynchronous transfer mode channel, for generating a test cell having a tag attached to a header thereof, the tag including test cell information which specifies a particular path in the asynchronous transfer mode channel to be tested, said test cell generating trunk means supplying the test cell to the asynchronous transfer mode channel to be tested;

test cell detecting means, provided in each of a plurality of switches of the asynchronous transfer mode channel, for detecting whether a switch along the particular path specified by the test cell has been switched and providing a maintenance scan signal indicative of a result of the detecting means; and controlling means for testing the switch along the particular path specified by the test cell by judging whether said test cell detecting means provides the maintenance scan signal.

2. The asynchronous transfer mode channel testing apparatus according to claim 1, wherein the asynchronous transfer mode channel is a multi-stage self-routing channel having self-routing modules connected in plural stages, the switches being provided in each of the self-routing modules.

3. The asynchronous transfer mode channel testing apparatus according to claim 1, wherein a plurality of said test cell generating trunk means are provided for each input highway to the asynchronous transfer mode channel to multiplex the test cell on the input highway at a corresponding free cell timing of the input highway.

4. The asynchronous transfer mode channel testing apparatus according to claim 3, wherein each of said plurality of test cell generating trunk means comprises means for generating the test cell having the tag, the tag further including test cell information identifying one of the switches along the asynchronous transfer mode channel corresponding to the input highway in which said test cell generating trunk means is provided.

5. The asynchronous transfer mode channel testing apparatus according to claim 1, wherein said controlling means comprises means for testing the switch along the particular path specified by the test cell by judging whether said test cell detecting means in the switch provided the maintenance scan signal in a predetermined period of time after the test cell is generated by said test cell generating trunk means.

6. An asynchronous transfer mode channel testing apparatus for testing an asynchronous transfer mode channel having self-routing modules connected in multiple stages for switching cells supplied from a plurality of input highways to a plurality of output highways, the self-routing modules having crossing points to pass cells, said asynchronous transfer mode channel testing apparatus comprising:

test cell generating means, provided respectively in the input highways, for sequentially generating a plurality of test cells on all possible paths of the self-routing modules to enable the crossing points of the self-routing modules to pass cells inputted from the input highways, the test cells being generated with test cell identifying information for identifying themselves as test cells and also being generated with input highway identifying information; and test cell checking means, provided respectively in the output highways, for checking whether a predetermined number of test cells were detected by identifying test cells through extraction of the test cell identifying information from the test cells output from the self-routing modules to the output highways and by extracting the input highway identifying information from the identified test cells.

7. The asynchronous transfer mode channel testing apparatus according to claim 6, wherein said test cell generating means further comprise virtual channel converters and comprise means for converting virtual path identifiers or virtual channel identifiers to pieces of tag information, and said test cell generating means comprises means for generating the test cells having the pieces of tag information, the tag information specifying the crossing points in the self-routing modules to switch cells.

8. The asynchronous transfer mode channel testing apparatus according to claim 7, wherein said test cell generating means further comprises means for attaching the input highway identifying information and the test cell identifying information to free regions in the tag information in a header of the test cells and for storing the pieces of said tag information attached to the test cell in one of said virtual channel converters.

9. The asynchronous transfer mode channel testing apparatus according to claim 6, wherein said test cell checking means comprises means for testing the self-routing modules by checking whether a predetermined number of test cells from each of the input highways were detected during a predetermined period of time after said test cell generating means began generation of the test cells.

10. An asynchronous transfer mode channel testing apparatus for testing a plurality of trunks used for interfacing with foreign offices and for testing an asynchronous transfer mode channel used for switching cells inputted from plural input highways through the trunks to a plurality of output highways, said asynchronous transfer mode channel apparatus, comprising:

test cell generating trunk means, provided on the input side of the asynchronous transfer mode channel, for generating a test cell having a test cell identification bit in a header thereof, the test cell identification bit identifying the cell of the header as a test cell, said test cell generating trunk means supplying the test cell to the asynchronous transfer mode channel; and turnaround means, provided the trunks, for identifying a test cell by extracting the test cell identification bit from cells sent through tested paths of the asynchronous transfer mode channel, and for returning the extracted test cell to the tested paths of the asynchronous transfer mode channel.

11. The asynchronous transfer mode channel testing apparatus according to claim 10, wherein said test cell generating trunk means comprises means for storing cell path selection information in the header of the test cell which specifies particular paths in the asynchronous transfermode channel to be tested, and said asynchronous transfer mode channel testing apparatus further comprises tag operating means for replacing a tag attached to the header of the test cell returned by said turnaround means with another tag based on the cell path selection information stored in the header of the test cell, said tag operating means supplying the test cell to the asynchronous transfer mode channel.

12. The asynchronous transfer mode channel testing apparatus according to claim 11, wherein said test cell generating trunk means further comprises means for attaching to the header of the test cell a tag capable of addressing a first one of the trunks on particular paths to be tested.

13. The asynchronous transfer mode channel testing apparatus according to claim 10, wherein:

said test cell generating trunk means comprises means for storing cell path selection information in the header of the test cell which specifies particularly paths terminated at said test cell generating trunk means in the asynchronous trunk mode channel to be tested; and said asynchronous transfer mode channel testing apparatus further comprises controlling means for testing the asynchronous transfer mode channel by judging whether the test cell generated from said test cell generating trunk means returns to said test cell generating trunk means and by comparing whether the test cell generated by said test cell generating trunk means and the test cell returned to said test cell generating trunk means have the same content.

14. The asynchronous transfer mode channel testing apparatus according to claim 10, wherein said turnaround means comprises means for returning the extracted test cell around to the tested paths on the asynchronous transfer mode channel at the corresponding free cell timings of the input highways.

15. An asynchronous transfer mode channel testing apparatus for testing an asynchronous transfer mode channel formed by self-routing modules connected in multiple stages for switching cells supplied from a plurality of input highways respectively to a plurality of output highways, comprising:

test cell inserting means, provided respectively in said input highways, for sequentially generating a plurality of test cells carrying virtual identifiers indicating test cells in their headers and test data in their payloads;

test cell tag attaching means, provided respectively in said input highways, for attaching, to test cells multiplexed respectively over to said input highways by said test cell inserting means, tags enabling switching operations to be performed at desired crossing points in said self-routing modules; and test cell checking means, provided respectively in said output highways, for extracting test cells by identifying virtual identifiers attached to the headers of cells outputted to said output highways from said self-routing modules, and for examining test data attached to the payloads to said test cells thus extracted.

16. The asynchronous transfer mode channel testing apparatus according to claim 15, wherein:
said test cell inserting means multiplexes one of said test cells each time a predetermined number of cells other than a test cell pass through on the corresponding one of said input highways.

17. An asynchronous transfer mode channel testing apparatus for testing an asynchronous transfer mode channel formed by self-routing modules connected in multiple stages for switching cells supplied from a plurality of input highways respectively to a plurality of output highways, comprising:
test cell inserting means, provided respectively in said input highways, for sequentially generating a plurality of test cells carrying virtual identifiers indicating test cells in their headers and test data in their payloads, wherein
said test cell inserting means attaches, to respective octets of the payloads of said test cells, consecutive values sequentially incremented or decremented from the values in the header octets of said payloads;
test cell tag attaching means, provided respectively in said input highways, for attaching, to test cells multiplexed respectively over to said input highways by said test cell inserting means, tags enabling switching operations to be performed at desired crossing points in said self-routing modules; and
test cell checking means, provided respectively in said output highways, for extracting test cells by identifying virtual identifiers attached to the headers of cells outputted to said output highways from said self-routing modules, and for examining test data attached to the payloads to said test cells thus extracted, wherein
said test cell checking means examines the payload abnormality of said test cells by judging whether said test data values attached to respective octets in the payloads of said test cells extracted are said consecutive values sequentially incremented or decremented.

18. An asynchronous transfer mode channel testing apparatus for testing an asynchronous transfer mode channel formed by self-routing modules connected in multiple stages for switching cells supplied from a plurality of input highways respectively to a plurality of output highways, comprising:
test cell inserting means, provided respectively in said input highways, for sequentially generating a plurality of test cells carrying virtual identifiers indicating test cells in their headers and test data in their payloads, wherein
said test cell inserting means, generates successively in a predetermined number and attaches to respective octets of payloads of respective test cells, consecutive values sequentially incremented or decremented from the values in the header octets of the payload of a first test cell of said predetermined number of test cells, wherein
test cell tag attaching means, provided respectively in said input highways, for attaching, to test cells multiplexed respectively over to said input highways by said test cell inserting means, tags enabling switching operations to be performed at desired crossing points in said self-routing modules, wherein
said test cell tag attaching means attaches the same tag to each of said predetermined number of test cells multiplexed successively over to said input highways by said test cell inserting means; and
test cell checking means, provided respectively in said output highways, for extracting test cells by identifying virtual identifiers attached to the headers of cells outputted to said output highways from said self-routing modules, and for examining test data attached to the payloads to said test cells thus extracted, wherein
said test cell checking means examines the payload abnormality and loss of each of said test cells by judging whether said test data values attached to respective octets of the payloads in each of said test cells successively extracted are consecutive values sequentially incrementing or decrementing starting from the test data values in the header octet.

* * * * *